United States Patent Office 3,328,530
Patented June 27, 1967

3,328,530
DIRECTOR SYSTEM WITH TIME DIVISION ACCESS OF A COMMON TRANSLATOR
Robert M. Schildgen, Northbrook, and John S. Young, Addison, Ill., assignors to Automatic Electric Laboratories, Inc., Northlake, Ill., a corporation of Delaware
Filed Oct. 10, 1963, Ser. No. 315,257
33 Claims. (Cl. 179—18)

ABSTRACT OF THE DISCLOSURE

A director system wherein a plurality of primarily electromechanical register-sender equipments share a common translator on a time division basis. A common electronic translator continuously scans the plurality of registers and supplies the corresponding senders with translated information. Upon receipt of sufficient directory digits the translator provides a partial translation, initiates outpulsing, and then constantly up-dates translation as more directory digits are registered. A switched battery potential and a switched ground potential which associate each register-sender combination with the common translator are also employed, along with the switch train holding conductor (usually the "C" lead) and pulse detection apparatus, to provide a detection circuit which may be employed to define and identify an unlimited number of service classes for an individual line circuit.

This invention relates to director systems and more particularly to director systems in which a plurality of register-senders access a common translator on a time division basis.

In some director systems a register-sender and a translator are connected back-to-back, therefore, a translator is required per register-sender. In other systems there is a concentration between a number of register-senders and a translator; the register-sender calls for a translation and holds the translator until routing instructions have been completed. By way of contrast, in the present invention, a plurality of register-senders are each assigned a separate time slot or time position and each access a common translator only during the assigned time slot. Each register-sender continuously puts information into the translator and each is continuously receiving routing and control information from the translator. Therefore, a register-sender does not call for a translation as is the conventional practice; the translator, in effect, is always associated with each register-sender.

Briefly, when a subscriber dials a directory number, either by D.C. pulsing or by multifrequency tone signaling, each digit is registered on a space division basis by a group of relay means. As each dialed digit is registered, the information carried by its value and its location in the directory number is made available to the common translator to be interpreted. The translator interprets the dialed information and instructs the register-sender to perform its functions accordingly. Translator instructions for the particular embodiment shown are in the form of time division marks in a two-out-of-five and a three-out-of-five pattern.

If the called number is within the local area, the register-sender will be so instructed and released after area recognition; the remainder of the digits are dialed directly into the forward switch train. An extended area service call (EAS) to EAS trunks will be routed via a particular selector level or levels. In a similar manner toll calls are routed via a selector level or levels to toll ticketing equipment where party identification may be established, if required, and the remainder of the digits may be dialed directly into the toll ticketing equipment; the register-sender then releasing.

The particular digit recognition and routing functions may be designed to cancel or absorb those digts which are not needed in a new office installation. However, the translator can also be designed to let switches such as digit absorbing selectors cancel such digits when the director system is added to an existing telephone office.

What might be called the heart of our director system is a time division power supply, a modification of that disclosed in our United States patent application, "Time Division Signaling Arrangement," Ser. No. 295,098, filed July 15, 1963, and assigned to the same assignee as our present invention. During each time slot, the time division power supply is employed as a signaling arrangement and furnishes switched potentials, battery and ground, to the register-sender associated with that particular time slot. Hereinafter, phrases such as switched battery, switched ground, time battery, time ground and switched potentials, should be understood to refer to direct current potentials or pulses occurring only during the individual time slots. The switched ground potential is supplied directly to the sender portion of the register-sender, while the switched battery is sent as a multiplicity of switched battery marks via the register portion and the translator to the sender. These switched potentials are coded in the register-sender and interpreted in the translator as control signals causing outpulsing, absorbing digits, and release of the register-sender, as a few examples.

When a dialed code is identified as one requiring translation and machine outpulsing, the first routing digit is "read" from the translator and converted into loop pulses. The source of these loop pulses is an electronically controlled relay; it may be advantageous to incorporate sealed mercury-wetted contacts to insure a long contact life of this relay. The routing digits are sent in sequence separated by appropriate interdigital pauses. After the last routing digit, a special instruction from the translator in the form of a two-out-of-five digit code will cause the remainder of the digits to be outpulsed in sequence deleting those of the remaining digits of the called number that are not required to complete the telephone call.

A feature of the invention resides in the use of a "flow through" translation technique. Since the translator, although common, is effectively always associated with each register-sender, there is no need to store translated routing information as is conventionally done. Such information is continuously available to each register-sender at the translator routing commons and is utilized by each register-sender directly from these commons during the corresponding time slot.

Another feature of our director system resides in the outpulse counting and timing functions of the register-sender. An oscillator is employed to drive relay means for opening and closing the outpulsing loop. The energizing potential for the oscillator is supplied by way of a multiplicity of possible closed circuits. These circuit possibilities are each closed by the conjunct operation of time division readout relays on the one hand and an outpulsing counting chain of relays on the other hand. As will be seen more clearly below, as long as continuity exists in any one of the several possible supply paths, the outpulsing generator will operate. Interdigital timing is achieved in the same manner by overriding the effect of the oscillator driven outpulsing relay and setting the outpulsing chain for a certain time value.

Still another feature of the invention resides in the dual use of a relay counting chain for registering dialed digits. This relay chain may be used for counting D.C. dial pulses and the individual relays therein may be operated by D.C. potentials as a result of multifrequency dial signals, the use of which is becoming increasingly prominent in push button telephone subsets. The register-sender of our director system may be employed in telephone systems which offer both D.C. pulsing and MF signaling subsets.

Still another feature of the invention is the unique method of determining various classes of service. As will be explained in greater detail, a voltage spike is transmitted on a time division multiplex basis from the register-sender to the subscriber's line equipment via what is commonly referred to in step-by-step switching equipment as the "C" lead. A class of service access circuit for each of the particular subscriber classes couples this signal back to the translator for class of service detection. Theoretically, an infinite number of classes can be detected in this manner.

The object of the invention is to provide a new and improved director system.

A more particular object of the invention is to provide a new and improved director system in which a plurality of register-senders are associated with a single translator on a time sharing basis.

Another object of the invention is to provide a new and improved outpulsing prime mover.

Still another object of the invention is to provide a new and improved director system in which it is not required to store translated routing information, but to utilize such information directly from the translator.

Other objects and features of the invention not specifically set forth, and the invention, as to its organization and its operation, will best be understood from the following description taken in conjunction with the accompanying drawings.

In the drawings:

FIG. 1 is functional block diagram representation of the invention shown in the environment of a step-by-step telephone switching system.

FIGS. 2 through 14 together form a complete circuit representation of our novel director system as seen by one of the register-senders; the other register-senders operate in a similar manner and reference in this respect should be made to the said one register-sender.

FIG. 15 shows the proper organization and orientation of FIGS. 2 through 14.

Figure 1:
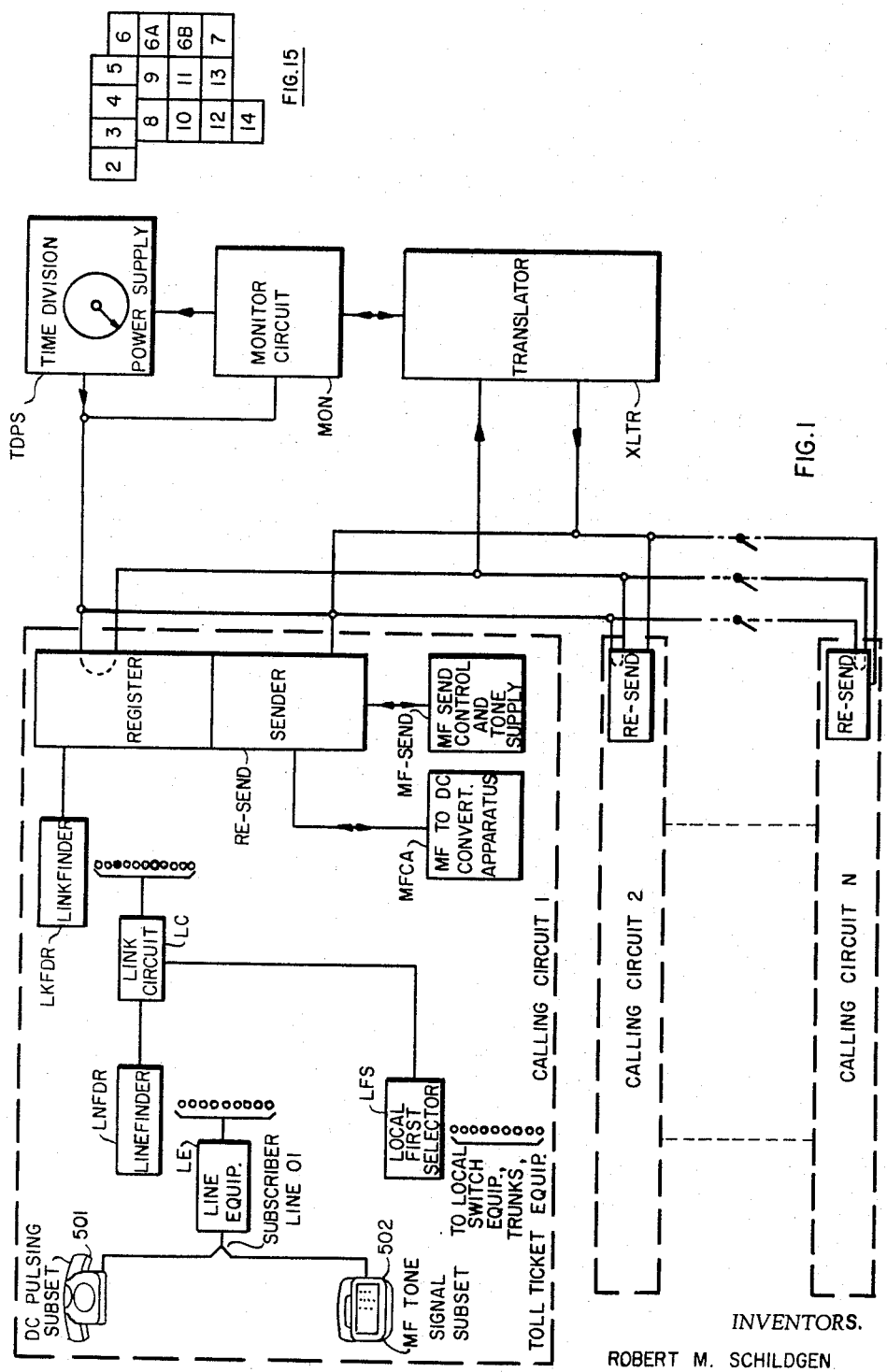

More specifically FIGS. 2 through 5 and FIGS. 8 through 14 describe an embodiment of the register-sender; FIGS. 6, 6A, and 6B describe an embodiment of the translator; and FIG. 7 generally describes the time division power supply and the monitor circuit for the translator.

FIGS. 2 through 14 are shown in the detached contact form and may be more easily read by using the following table of relay and contact locations. Obvious or conspicuous relays and contacts have been omitted from this table. The table reads from left to right, first stating the relay and then its contacts. The relay and the contact locations are directly below the respective references. Each figure has been divided into six sections, upper left UL, upper center UC, upper right UR, lower left LL, lower center LC, and lower right LR. The numeral or numerals appearing before these section abbreviations indicates the figure in which the relay or contact appears. For example, immediately below relay AT reference one finds the location 9UC. Therefore, relay AT is found in the upper center portion of FIG. 9. Contact RS–5 of relay RS can be found in the upper right portion of FIG. 3, that is at location 3UR.

TABLE I.—RELAY AND CONTACT LOCATION

| A<br>2UC | A–1<br>2UC | A–2<br>8UL | | | | | | |
|---|---|---|---|---|---|---|---|---|
| AB<br>9UL | AB–1X<br>8UL | AB–2<br>8LL | AB–3<br>14UR | AB–4<br>8UL | AB–5<br>8UC | AB–6<br>9UR | | |
| AR<br>11UC<br>13LC | AR–1X<br>11UC | AR–2<br>9LC | AR–3<br>13LC | AR–4<br>9UR | AR–5<br>9LC | | | |
| AS<br>9UC | AS–1X<br>9UL | AS–2<br>9LC | AS–3<br>14UR | AS–4<br>9UC | AS–5<br>8LL | AS–6<br>11UR | | |
| AT<br>9UC | AT–1X<br>8LL | AT–2<br>9UL | AT–3<br>9UL | AT–4<br>9LC | AT–5<br>9LC | AT–6<br>8LL | AT–7<br>8LL | AT–8<br>8LL |
| B<br>2UC | B–1<br>8UL | B–2<br>8UL | B–3<br>2UC | B–4<br>2UC | B–5<br>2UC | | | |
| BA<br>14LL | BA–1<br>2LC | BA–2<br>10LL | BA–3<br>10LL | BA–4<br>2LC | BA–5<br>10LC | BA–6<br>8UL | BA–7<br>8UL | |
| 8UC | BA–8<br>2LC | BA–9<br>2LC | BA–10<br>8LC | BA–11<br>8LC | BA–12<br>14UL | BA–13<br>9LR | BA–14<br>11LL | |
| BB<br>2UR | BB–1<br>10UC | BB–2<br>8UC | BB–3<br>2UR | BB–4<br>8UC | BB–5<br>10UL | BB–6<br>2UR | BB–7<br>2UR | |
| C<br>2UR | C–1<br>2LR | C–2<br>2UC | C–3<br>2UC | C–4<br>8UL | C–5<br>8UL | | | |
| CB<br>2UC | CB–1<br>10LC | CB–2<br>10LC | CB–3<br>8UL | CB–4<br>10UL | CB–5<br>8UL | CB–6<br>2UL | CB–7<br>2LR | CB–8<br>2LR |
| CD–6<br>3LR | CD6–1<br>3LL | CD6–2<br>3UL | CD6–3<br>3UL | | | | | |
| CL<br>3UR | CL–1X<br>10LL | CL–2<br>8LR | CL–3<br>11UR | CL–4<br>10UC | CL–5<br>8UR | CL–6X<br>3UR | CL–7<br>10UR | CL–8<br>3UR | CL–9<br>11UR |
| CS6<br>12LR | CS6–1X<br>12LC | CS6–2<br>14UR | CS6–3<br>14UR | | | | | |

TABLE I.—Continued

| DS 9UL | DS-1X 8UL | DS-2 8UL | DS-3 14UR | DS-4 8UC | DS-5 8UR | DS-6 11LL | DS-7 9UR | DS-8 8LL | DS-9 8LL | |
|---|---|---|---|---|---|---|---|---|---|---|
| NC 8LR | NC-1 8UC | NC-2 5UC | NC-3 10UR | NC-4 10UR | | | | | | |
| P 14UL | P-1X 14UL | P-2 14UC | P-3 12UL | P-4 12UL | P-5 14UL | P-6 8UL | P-7 14UC | | | |
| PC 11UL | PC-1 14UL | PC-2 14UL | | | | | | | | |
| PM 14UC | PM-1 12UL | PM-2 12UL | PM-3 8LL | PM-4 8LL | | | | | | |
| PS 14UL | PS-1 11LL | PS-2 12UL | PS-3 12UL | PS-4 ------ | PS-5 14UC | PS-6 9UR | PS-7 14UC | PS-8 15UC | PS-9 9UR | PS-10 8UL |
| RL 10UC | RL-1X 10LL | RL-2 2LC | RL-3 2LC | RL-4 10UL | RL-5 10UC | RL-6 2LL | | | | |
| | RL-7 10LC | RL-8 10LC | RL-9 8UC | RL-10 10LL | RL-11 10UC | | | | | |
| RS 8UC | RS-1X 8UR | RS-2 4LR | RS-3 8UL | RS-4 8LR | RS-5 3UR | | | | | |
| SD 8UL | SD-1 11LL | | | | | | | | | |
| SQ 9LC | SQ-1 ------ | SQ-2 9LR | SQ-3 9UR | SQ-4 11UC | SQ-5 14UR | SQ-6 14UC | SQ-7 9UL | | | |
| T0 13UC 9LR | T0-1 9LC | T0-2 9UC | T0-3 11UC | T0-4 11UL | T0-5X 9UR | T0-6 13UC | T0-7 14UR | T0-8 14UR | T0-9 14UR | |
| T1 9LR 13UC | T1-1 9UC | T1-2 9UC | T1-3 9LC | T1-4 11UC | T1-5 11UL | T1-6X 9LR | T1-7 13UC | T1-8 14UR | T1-9 14LR | |
| T2 9LR 13UC | T2-1 9LC | T2-2 9UC | T2-3 11UC | T2-4 11UL | T2-5X 9LR | T2-6 13UC | T2-7 14LR | T2-8 14LR | T2-9 9UL | |
| T4 9LR 13LC | T4-1X 9LR | T4-2 9LC | T4-3 11UC | T4-4 11UL | T4-5 14LR | T4-6 13LC | T4-7 9UC | T4-8 14LR | T4-9 14LR | T4-10 9UL |
| T7 9LR 13LC | T7-1X 9LR | T7-2 9UR | T7-3 11UC | T7-4 11UL | T7-5 9LC | T7-6 13LC | T7-7 9UC | T7-8 14LR | T7-9 14LR | T7-10 9UC |
| TD 5LL 11LC | TD-1 5LC | TD-2 10LC | TD-3 11LL | TD-4 10LC | TD-5 10UL | | | | | |
| TM 10LR | TM-1 8LC | TM-2 8UC | | | | | | | | |
| TV 10LL | TV-1 10LL | TV-2 10LL | TV-3 10LL | TV-4 10LL | TV-5 10LL | TV-6 10LL | TV-7 10LL | | | |

Relay contacts which operate first are well known in the art as XV contacts. Such contacts have been given the suffix X (i.e. T4–1X notes that contacts 1 of relay T4 operate before the other contacts of relay T4).

(1.0) GENERAL DESCRIPTION

Referring to Calling Circuit 1 of FIG. 1, when a subscriber, having a D.C. pulsing subset 501 or an MF signaling subset 502, lifts his handset to initiate a telephone call, a D.C. loop is closed to his line equipment LE and his calling line is found by a linefinder LNFDR in a well known manner. Connected back-to-back with linefinder LNFDR via link circuit LC is the local first selector LFS. At the same time that the linefinder begins to hunt for the calling line, the linkfinder LKFDR begins to search for the appropriate link circuit LC. The linkfinder is connected back-to-back with a register-sender RE-SEND and when both the linefinder and the linkfinder find the calling line and the link access circuit, respectively, the register-sender is seized. Assuming that the register-sender of the now established Calling Circuit 1 is assigned to a first time slot, routing information will be translated during time slot 1 for that register-sender and the translator XLTR will control the register-sender during time slot 1.

The monitor Circuit MON is also assigned one of the time slots and checks the operation of the translator and the time division power supply TDPS during its assigned time slot, as will be expained below.

(2.0) TIME DIVISION POWER SUPPLY

A plurality of register-senders access a single translator on a time sharing baisis. Therefore, a register-sender does not request or call for a translation as is the common practice, the translator is effectively permanently connected to each register-sender and continuously furnishes instructions therefor.

Figure 7:
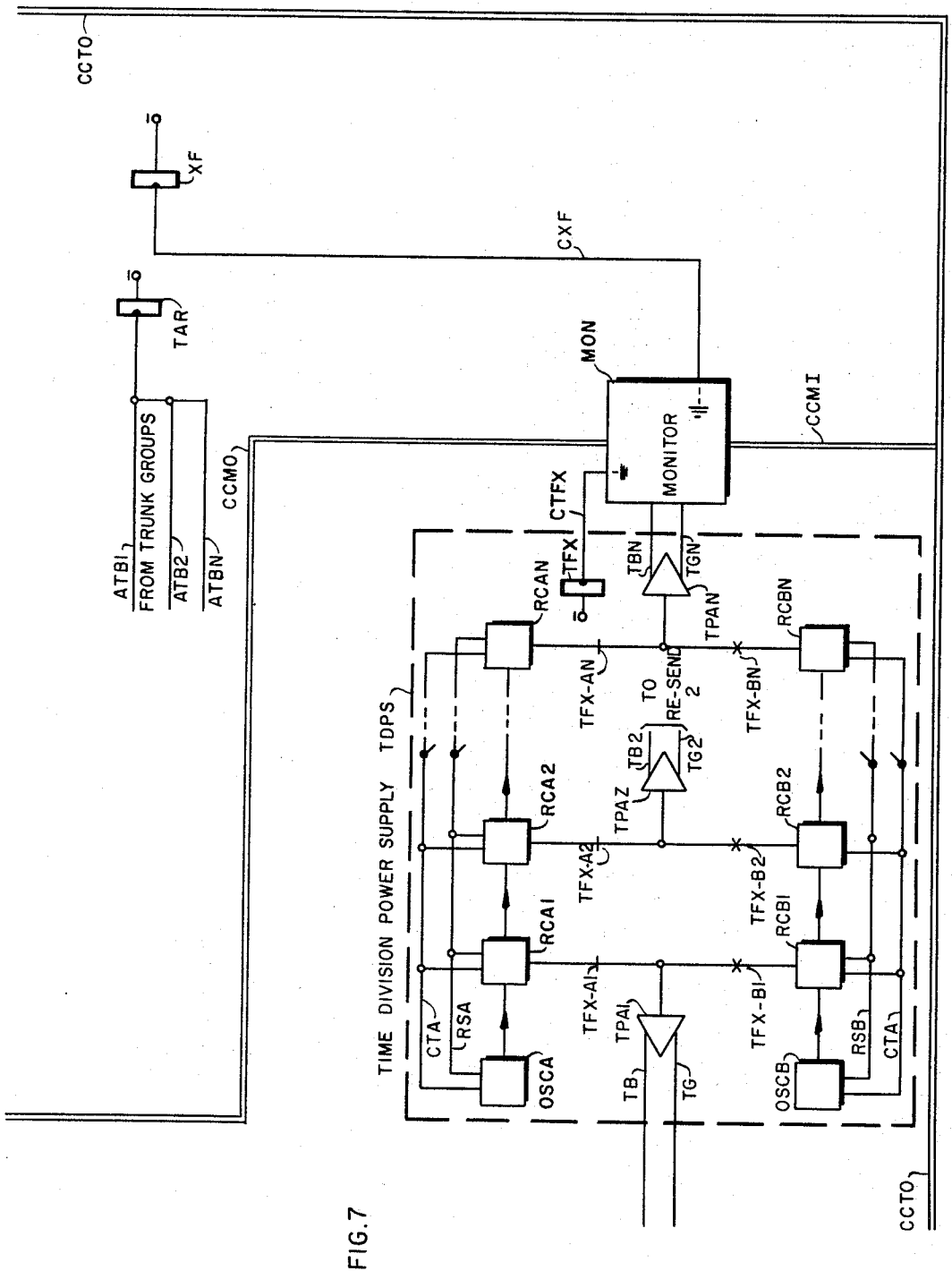

Referring to FIG. 7, a time division power supply of primary and secondary channels is shown. Each channel comprises an oscillator OSCA, OSCB and a ring counter circuit, stages RCA1 to RCAN and RCB1 to RCBN, N being the number of time positions. The oscillator drives the first counter stage, each counter being successively driven in a well known manner. The outputs of the counter stages enable power amplifiers TPA1 to TPAN, each having a switched battery output and a switched ground output. These outputs are connected to separate register-senders and to the monitor MON.

Transfer from the primary to the secondary channel is accomplished by relay TFX under the control of the monitor circuit in case of time division failures. As previously stated, the time division power supply is similar to that disclosed in the above U.S. patent application Ser. No. 295,098.

(3.0) SEIZURE OF REGISTER-SENDER

Referring now to the composite of FIGS. 2 through 14, the register-sender is marked idle by resistance battery at terminal G via contacts BA–1 and resistance R6 to battery potential, say −50 volts. When the line loop is closed, that is when a linkfinder and a linefinder have by overlapping operation connected a subscriber to the register-sender, a D.C. operating path is completed for relay A from ground potential via winding DTT2 of transformer DTT, BB–7, relay A winding 2, +1 lead, linkfinder and subscriber equipment, −1 lead, and relay A winding 1 to battery.

Relay A operates. Contacts A–2 close the outpulsing loop which will be explained below. Contacts A–1 close and extend operating ground potential to relay PR.

Relay PR operates. Contacts PR2 close extending ground potential to relay B.

Relay B operates. Contacts B–4 close extending a ground via the TONE START lead to the dial tone generating apparatus DT and dial tone is sent back to the calling subscriber via transformer DTT, BB–7 and relay A winding 2. Contacts B–3 close preparing an operating circuit for relay C. Contacts B–5 close readying the impulsing ground circuit for digit counting as will be explained in Section 4.0. Ground is also extended by way of B–2 and BA–7 to operate relay RS and then via RS–3 to operate relay BA.

When relay BA operates contacts BA–7 open and BA–6 close deenergizing relay RS so that dial digit codes may be stored and to provide a holding ground for relay BA, respectively. Contacts BA–1 open and BA–9 close replacing the resistance battery mark on conductor G with ground potential. Conductor H also has ground applied via contacts BA–4. Note that capacitor C12 is charged to battery potential through diodes CR7 and resistance R21 to prepare for class of service detection. Contacts BA–14 close the lead TG to the time division relays AR and T0 to T7.

Contacts BA–11 also connect ground to motor magnet MMI of rotary stepping switch SQI via its normally operated off-normal contacts ION–3 and its interrupter contacts IIN–1. Motor magnet MMI is energized by this ground, opens its interrupter contacts IIN–1, deenergizes, and steps the SQI wiper arms to the first bank position.

In a similar manner motor magnet MMO of rotary switch SQO is energized, deenergized, and stepped by a ground via contacts BA–11, BB–1, OON–3, OON–1, diode CR32, and interrupter contacts OIN–1.

Figure 14:
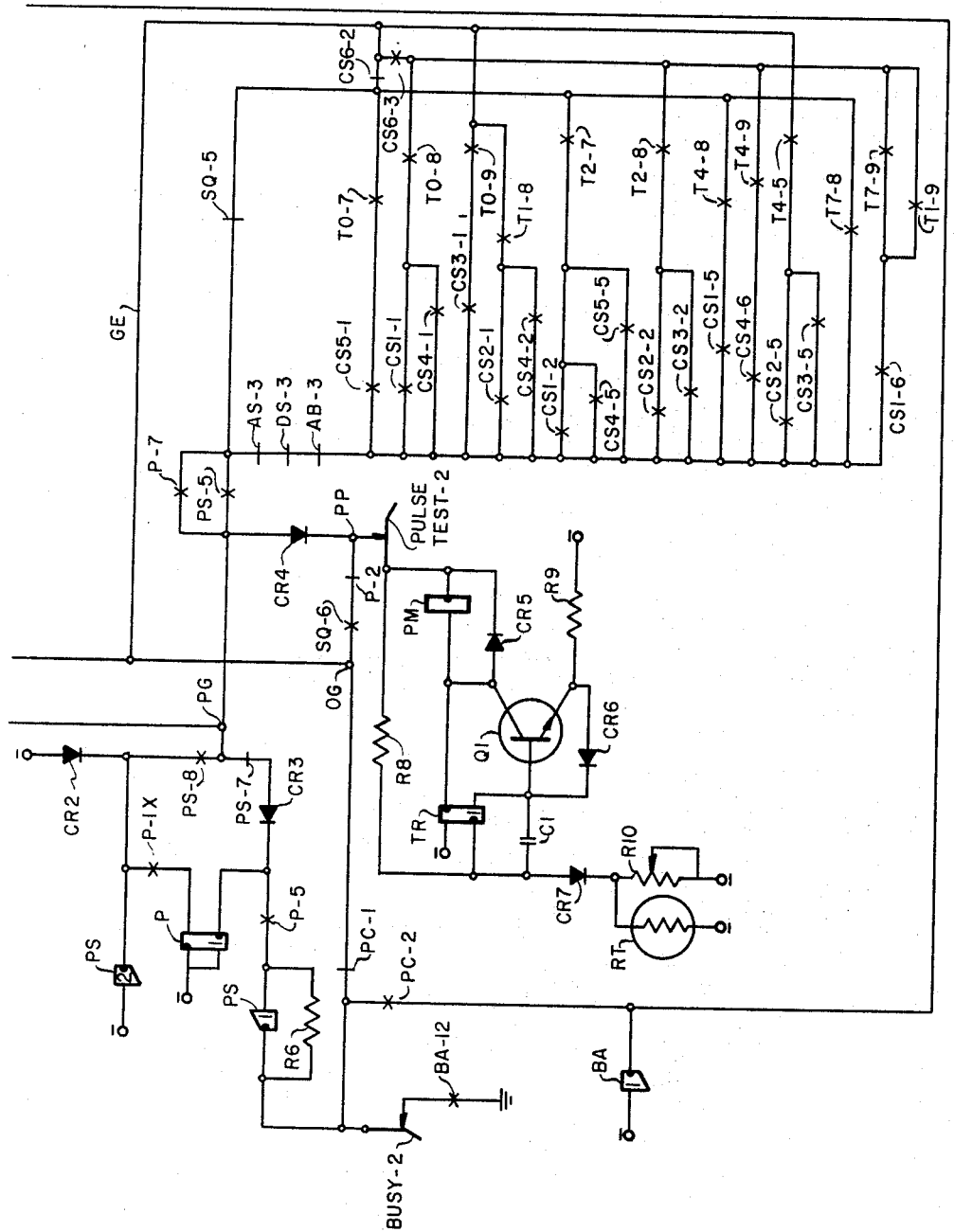

Contacts BA–11 also connect ground to relay DS winding 2 via strap ST–1 if the first digit is to be repeated to the local first selector. If ST–1 is provided and relay DS operates, its contacts DS–6 open the circuit between conductor TG and time division readout relays AR and T0 to T7. This path, it should be noted, had just been closed by BA–14. Contacts DS–3 also open the outpulsing counting chain circuit of relays CS1 to CS6 (FIG. 14).

Contacts BA–12 connect a ground to the outpulsing circuit to ready that circuit for operation and contacts BA–13 ready winding 2 of each of the relays T0 to T7 via contacts PS–6 and open contacts T0–5X, T1–6X, T2–5X, T4–1X, and T7–1X in multiple.

(4.0) SUBSCRIBER DIALED DIGITS

Assuming the register-sender has been seized by a subscriber as just described, relays A, PR, B, BA, and possibly relay DS will be operated.

In the embodiment shown the first dialed digit, the first two dialed digits on primary routes, or three dialed digits on two alternate routes are termed routing digits. These routing digits are translated into pulsed routing digits or MF routing digits. The remainder of the dialed digits are termed numerical digits and are transmitted through the register-sender without translation.

Table II shows the two-out-of-five code pattern employed in the present embodiment.

TABLE II.—TWO-OUT-OF-FIVE DIGIT CODES

| Digit: | Code |
|---|---|
| 1 | 0+1 |
| 2 | 0+2 |
| 3 | 1+2 |
| 4 | 0+4 |
| 5 | 1+4 |
| 6 | 2+4 |
| 7 | 0+7 |
| 8 | 1+7 |
| 9 | 2+7 |
| 0 | 4+7 |

(4.1) *Registering dialed digits (first routing digit)*

Relay A and relay PR follow the dial pulses, operating on a D.C. closed loop condition and restoring on a D.C. open loop condition. Since relay PR follows relay A, the following discussion will be directed to relay PR, the operation of relay A being understood from the foregoing.

At the first opening of the D.C. loop (the beginning of a dial pulse), relay PR, following relay A, restores. Contacts PR–1 close extending an operating ground via contacts B–3 of slow-to-release relay B to energize relay C. Contacts C–2 close extending ground from contacts B–5 to relay CB.

Relay CB operates. Contacts CB–6 close preparing a code mark ground path for a contact array of relay CD1 to CD5. Contacts CB–7 and CB–8 close a ground circuit via contacts B–5 to relay BB. Contacts CB–1 open and CB–2 close transferring relay TM winding 1 to battery via cold cathode tube CCT and resistance R11, thus keeping relay TM from operating. Contacts CB–3 short circuit relay SD winding B if relay DS has been operated.

Relay BB operates. Contacts BB–7 open and BB–6 close to remove dial tone from the line and place a holding ground on relay A, respectively. Contacts BB–3 close a holding ground to relay BB. Contacts BB–5 close placing ground on the wiper arms of level A of switch SQO. This same ground is also supplied via CB–4 to energize motor magnet MMI.

(4.2) *Counting chain operation*

Also upon the first opening of the subscriber's D.C. loop, as just described (the beginning of a dial pulse), ground potential is supplied at contacts PR–4 and has no effect since it faces open contacts of relays CD1 to CD5.

At the next closing of the D.C. loop ground potential is supplied to winding 2 of relay CD1 to operate relay CD1 via PR–3, R1, CD5–4, CD4–4, CD3–8, and CD2–8. Battery potential is connected to the other side of winding 2 of relay CD1.

At the second opening of the D.C. loop of holding ground is supplied to relay CD1 winding 2 via PR–4, CD1–3, and winding 1 of relay CD2. Relay CD2 operates on winding 1 in series with winding 2 of relay CD1. Contacts CD2–8 open removing a possible ground path for relay CD1. Contacts CD2–7 and CD2–3 close preparing holding ground paths for winding 2 of relay CD2.

At the second closing of the subscriber's loop a holding ground is supplied to winding 2 of relay CD2 via PR–3, R1, CD5–4, CD4–4, CD3–8, and CD2–7. At this time the holding ground for relay CD1 is lost at the open contacts PR–4 and relay CD1 is deenergized.

At the third opening of the D.C. loop a holding ground is supplied for winding 2 of relay CD2 and an operating ground is supplied for winding 1 of relay CD3 via PR–4, CD1–4, CD2–3, and winding 1 of relay CD3. Relay CD3 operates opening contacts CD3–8 and eliminating a ground circuit for winding 2 of relay CD2. Contacts CD3–7 and CD3–3 close setting up future holding ground circuits for relay CD3.

The third time the D.C. loop is closed, a holding ground is supplied for winding 2 of relay CD3 via PR–3, R1, CD5–4, CD4–4, and CD3–7. The open contacts at PR–4 eliminate the holding ground on winding 2 of relay CD2 and relay CD2 is deenergized.

Upon the fourth opening of the D.C. loop, a holding ground is supplied for winding 2 of relay CD3 and an operating ground for winding 1 of relay CD4 via PR–4, CD1–4, CD2–4, CD3–3, and winding 1 of relay CD4. Relay CD4 operates opening contacts CD4–4 and eliminating a ground circuit for relay CD3. Contacts CD4–3 and CD4–7 close setting up future holding ground connections for relay CD4.

At the fourth closing of the D.C. loop, holding ground is supplied to winding 2 of relay CD4 via PR–3, R1, CD5–4, and CD4–3. The open contacts at PR–4 remove the holding ground from relay CD3 and relay CD3 is deenergized.

Upon the fifth opening of the D.C. loop a holding ground for winding 2 of relay CD4 and an operating ground for winding 1 of relay CD5 is supplied via contacts PR–4, CD1–4, CD2–4, CD3–4, CD4–7, and winding 1 of relay CD5. Relay CD5 operates and opens contacts CD5–4 opening a ground circuit for winding 2 of relay CD4. Contacts CD5–7 and CD5–3 close setting up future holding ground circuits for relay CD5.

The fifth closing of the D.C. loop will extend a holding ground to winding 2 of relay CD5 via PR–3, R1, CD5–3, and CD1–4. Open contacts PR–4 remove the holding ground to deenergize relay CD4.

At the sixth opening of the D.C. loop a holding ground is supplied for relay CD5 and an operating ground for winding 1 of relay CD1 via PR–4, CD5–7, CD4–8, R2 in parallel with winding 1 of relay CD6, and winding 1 of relay CD1. Relay CD6 operates sufficiently to operate its "X" contacts, CD6–1X and supply a ground to winding 2 of relay CD6 fully operating that relay. Relay CD1 reoperates opening its contacts CD1–8 and eliminating a future ground circuit for winding 2 of relay CD5. Contacts CD1–7 and CD1–3 close setting up holding ground circuits for winding 2 of relay CD1.

The sixth closing of the loop will remove the holding ground on relay CD5 winding 2 at contacts PR–4 and relay CD5 will restore.

The relay counting chain will continue to count dial pulses in the foregoing manner until relay C recognizes the interdigital pause. That is, the slow-to-release relay C will remain energized until such a time that relay PR is held operated and does not supply a "ground kick" via contacts PR–1 to keep relay C energized. At the time of the interdigital pause, relay C deenergizes and removes the pulsing ground supplied via contacts B–5 and C–1 to the point DP. Contacts C–3 make before C–2 break when relay C restores extending the ground via B–5, C–3, CB–6, CD6–3, CD2–1 and CD2–5, wiper arms at the first bank position contacts of levels C and G of rotary switch SQI to storage relays N0 and N7, assuming the digit 7 had been dialed. Relays N0 and N7 operate and magnetically latch to store the digit 7.

The opening of contacts C–1 removes ground from point DP and all operated relays of the counting chain restore. The loss of ground at C–2 also causes relay CB to restore. Relay BB, however, remains operated via B–5 and its own contacts BB–3. Contacts CB–4 open ground from motor magnet MMI deenergizing the magnet. And switch SQI steps to the second position. Contacts CB–3 remove the short across relay SD winding B.

If relay DS was operated, contacts DS–2 opened and contacts A–2 repeated the first digit to the local first selector.

(4.3) Second routing digit

If it is necessary to dial a second routing digit, it may or may not act as a code selector. If it does not act as a code selector, it will be absorbed.

The same counting and storage function occurs as did in the immediately foregoing section. However, the second digit is stored by two of the group of relays P0 to P7, since switch SQI has already stepped to position its wiper arms on the second bank positions.

At the end of the second digit, relay CB is restoring, again removes ground from motor magnet MMI at its contacts CB–4, deenergizing the motor magnet and causing the switch SQI to step its wiper arms to their third bank positions.

(4.4) First numerical digit

Referring to Section 4.0, assume the third dialed digit is the first numerical digit. For example, level B of rotary switch SQI may be connected as shown for a maximum of two routing digits on primary routes and three routing digits on each of two alternate routes, this limitation not applying to desinations which have no alternate route. If no more than one alternate is required per route, level B may have only the first four bank contacts connected together to increase the number of routing digits to four on primary routes and five on alternate routes.

The first numerical digit and the remainder of the numerical digits are counted and stored per Section 4.2. At the end of each digit contacts CB–4 open causing the rotary switch SQI to step to the next position in anticipation of another digit.

(5.0) MULTIFREQUENCY (MF) DIALING

The invention may also be employed in installations where multifrequency dialing subsets is offered to subscribers as well as conventional D.C. pulsing subsets.

Figure 2:
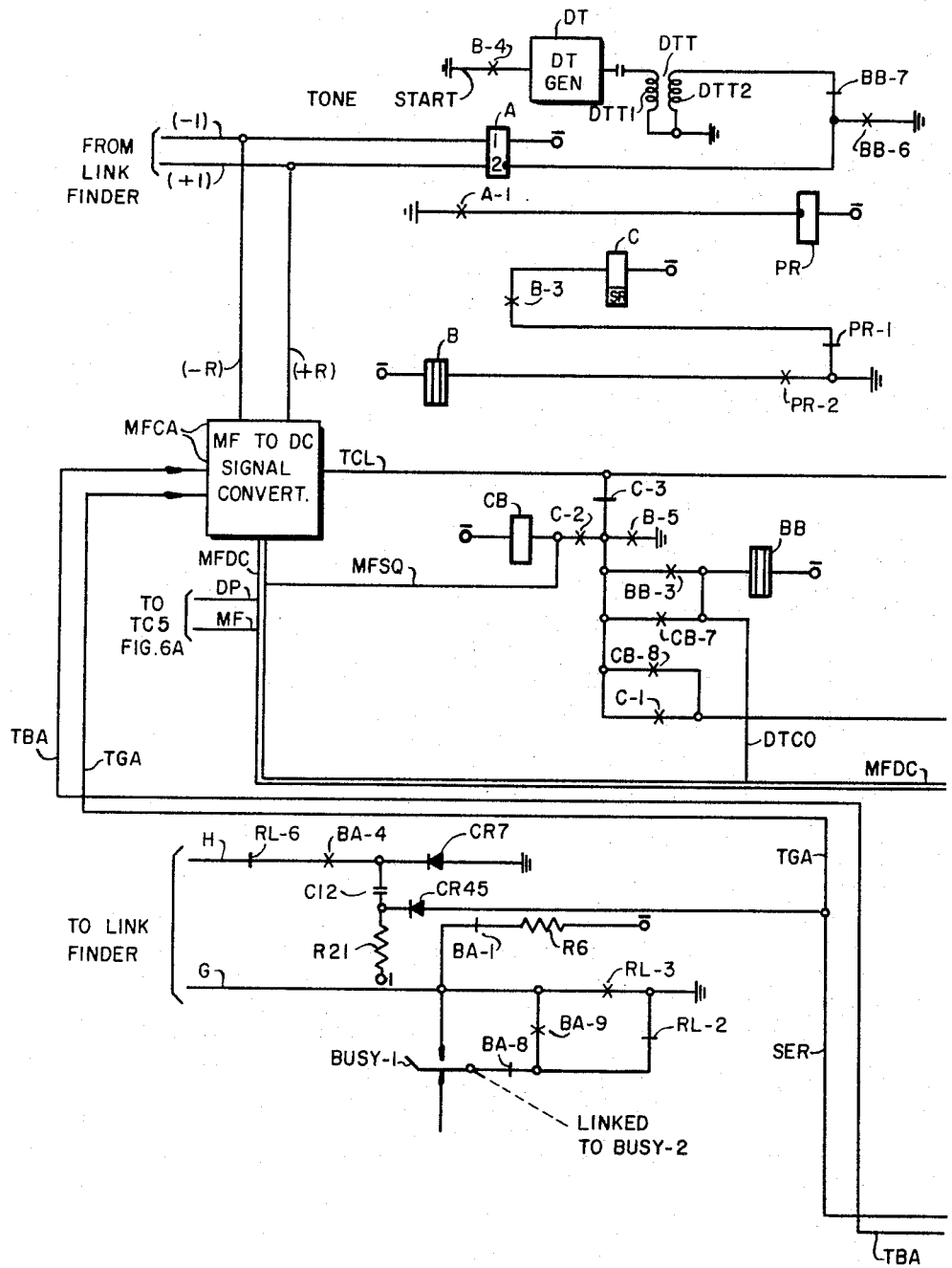
Figure 3:
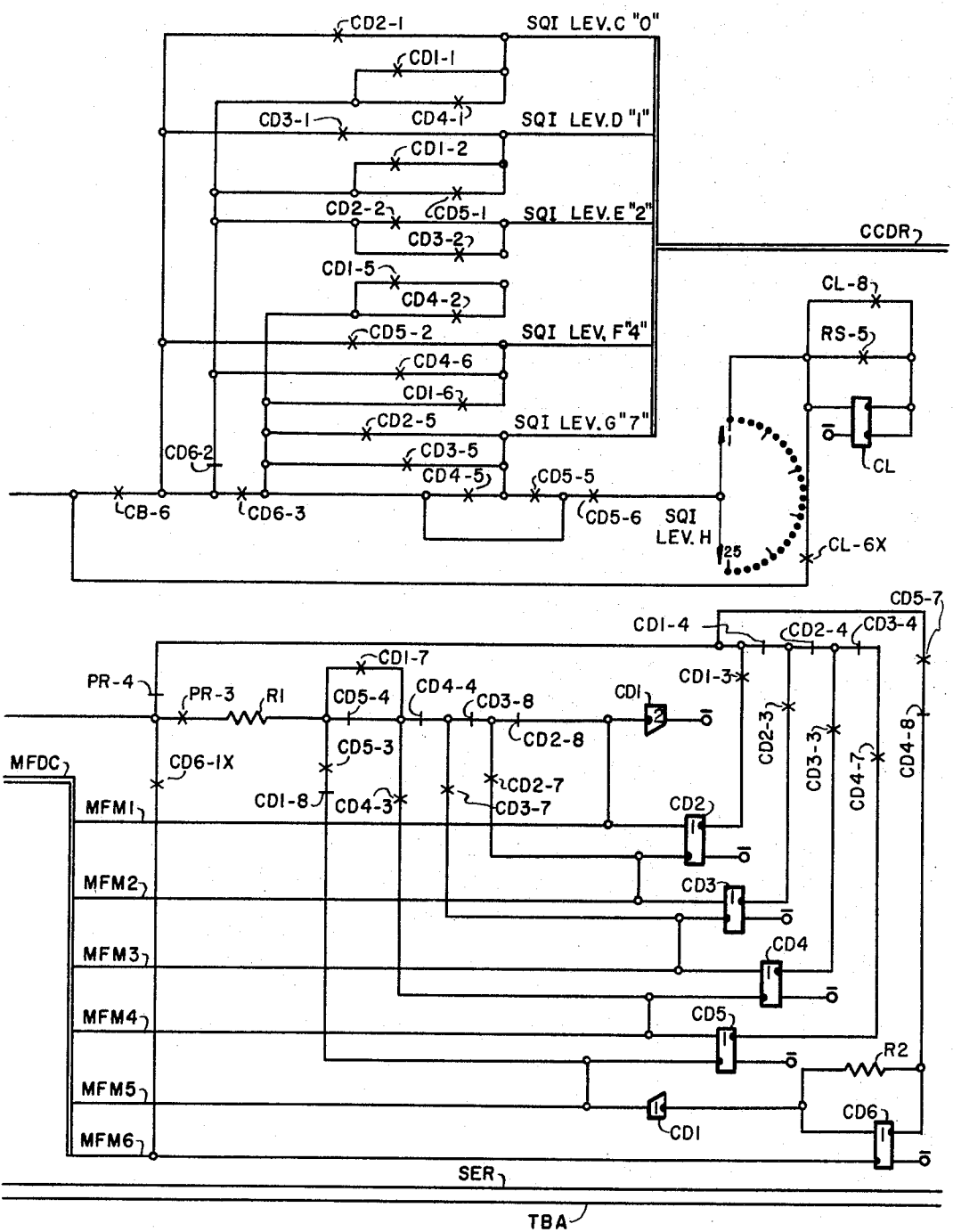

In such installations equipment is required to convert the multifrequency tones to some form that is compatible with D.C. pulse signals. Referring to FIGS. 1 and 2, this equipment is the MF to D.C. Converting Apparatus MFCA which converts MF signals to D.C. marks. These D.C. marks in turn enable the register portion of the register-sender to function, with a few exceptions, as if the MF signals were dial pulses.

The register-sender is seized in the same manner as it is for dial pulse operation. Relay A operates on a D.C. closed loop condition enabling relay PR, which in turn enables relay B to return dial tone to the subscriber, in this case the MF tone signals subset SOQ of FIG. 1. Relay BA is also operated per Section 3.0.

(5.1) Registering MF digits

Each time the subscriber operates his dial, perhaps a push-button, a MF signal is transmitted to the register-sender input connections +1 and −1 via his line equipment LE, linefinder LNFDR, link circuit LC, and linkfinder LKFDR. Leads +R and −R are respectively connected to lines +1 and −1 and extend the MF signals to the MF adaption equipment MFCA. This MF adaption equipment MFCA converts the digit indicative tone signals to ground potentials and extends these grounds to the appropriate register-sender equipment.

Figure 11:
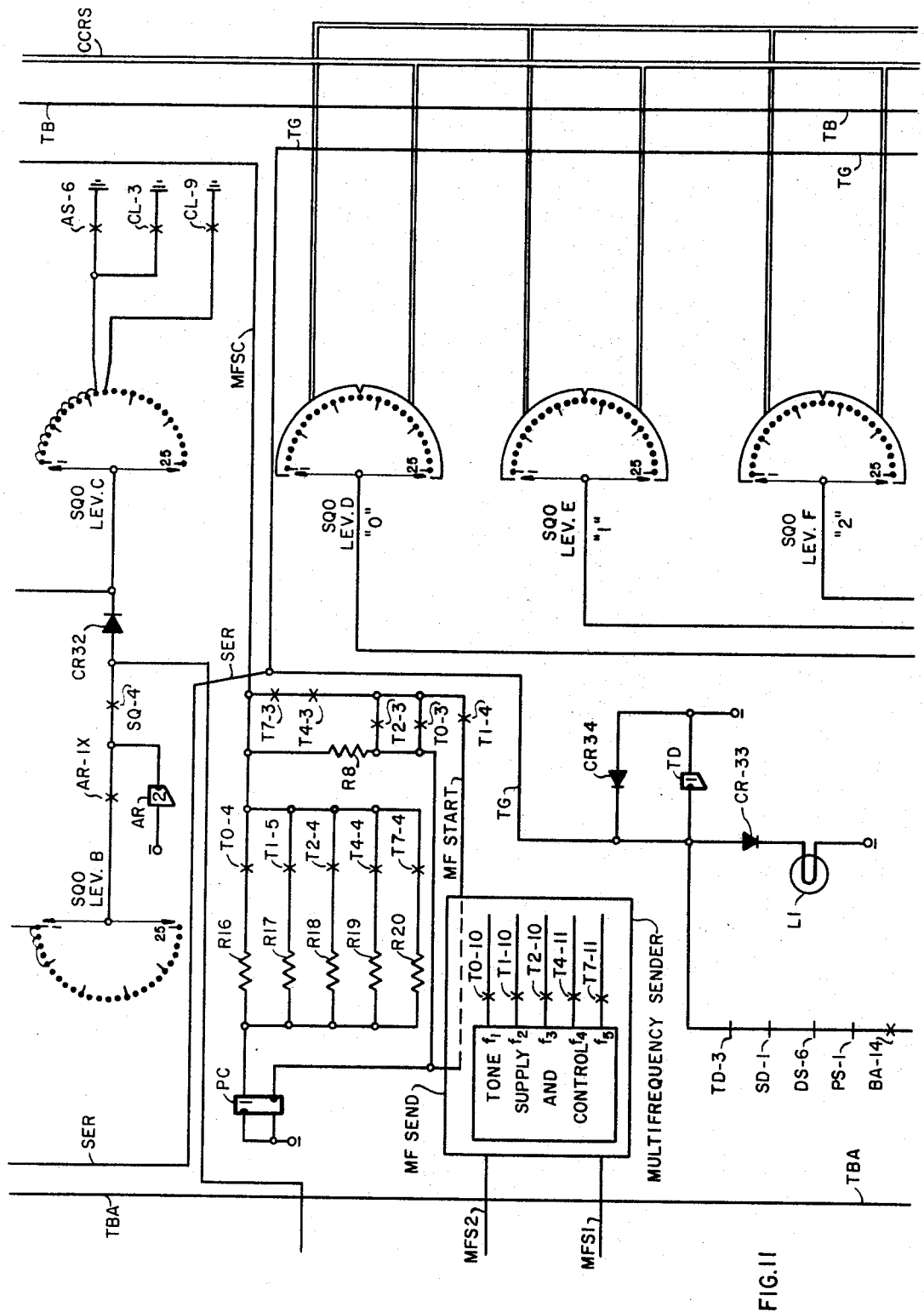

The switched ground potential is extended from the time division power supply TDPS of FIG. 7 over lead TG to FIG. 11 where it connects with lead SER. Lead SER extends this switched ground potential during the associated time slot across FIGS. 9, 4, 3, and 2 to connection TGA which enables the conversion equipment MFCA during the associated time slot period.

As an example, assume that the MF signals indicate that digits 3, 3, 4 are the first digits dialed. Relay BA in operating on seizure has caused rotary switch SQI to step self-interrupted via contacts BA–11, ION–3, and IIN–1 to the first position.

A ground mark is extended via lead DTCO, a portion of cable MFDC, to operate relay BB and remove dial tone as previously described. More particularly, relay BB in operating closes contacts BB–5 a ground mark on lead MFSQ, also a portion of cable MFDC, energizes relay CB. Relay CB operates extending a ground via BB–5 and CB–4 to again energize the motor magnet MMI.

Since the first of the illustrated digits is three (3), a ground mark is placed on lead MFM3 of cable MFDC to energize relay CD3 on its winding 2. Ground is extended via contacts B–5, C–3, CB–6, CD3–1 in multiple with CD6–2 and CD3–2 to position one of levels D and E of rotary switch SQI and therethrough to energize magnetically latching relays N1 and N2. Ground is removed from lead MFSQ to restore relay CB during the pause between digits. Contacts CB–4 open ground from motor magnet MMI and switch SQI advances to the second position. For the second digit, again 3, ground on lead MFSQ energizes relay CB causing contacts CB–4 to close and energize the motor magnet MMI. A ground mark again on lead MFM3 causes coded marks to be extended via contacts B–5, C–3, CB–6, CD3–1 in multiple with CD6–2 and CD3–2 and the second position contacts of levels D and E of switch SQI to energize relays P1 and P2. Again ground is removed from lead MFSQ, relay CB restores, and contacts CB–4 open ground from motor magnet MMI stepping the rotary switch SQI to the third position.

For the next digit, "4", ground is again placed on lead MFSQ to operate relay CB and in turn energize motor magnet MMI the register functions in a similar manner as for the previously dialed digits except relay CD4 is energized. Ground is extended via contacts B–5, C–3, CB–6, CD4–1 in multiple with CD6–2 and CD4–6, and the third position of levels C and F of rotary switch SQI to energize relays R0 and R4. Succeeding digits are registered in a similar manner.

From the above, it can easily be seen that the register-sender operation is similar for both D.C. pulsing and MF signals; the main differences being that in MF signaling the counting chain does not actually count and the sequence of switch SQI is controlled by the condition of lead MFSQ rather than the interdigital pause detection of relay C as it true for D.C. pulse signaling.

(6.0) REGISTER OUTPUT

Figure 5:
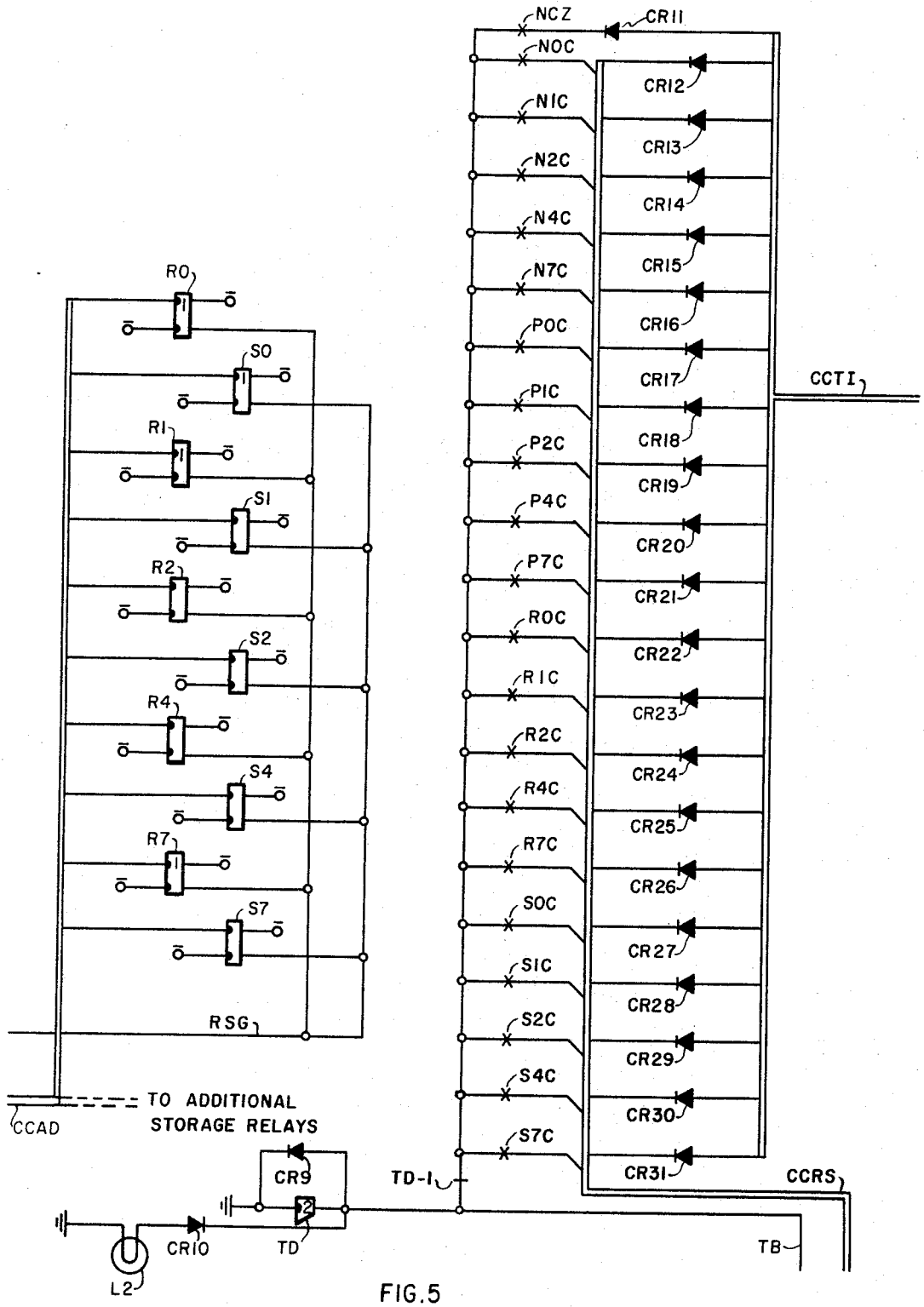
Figure 6:
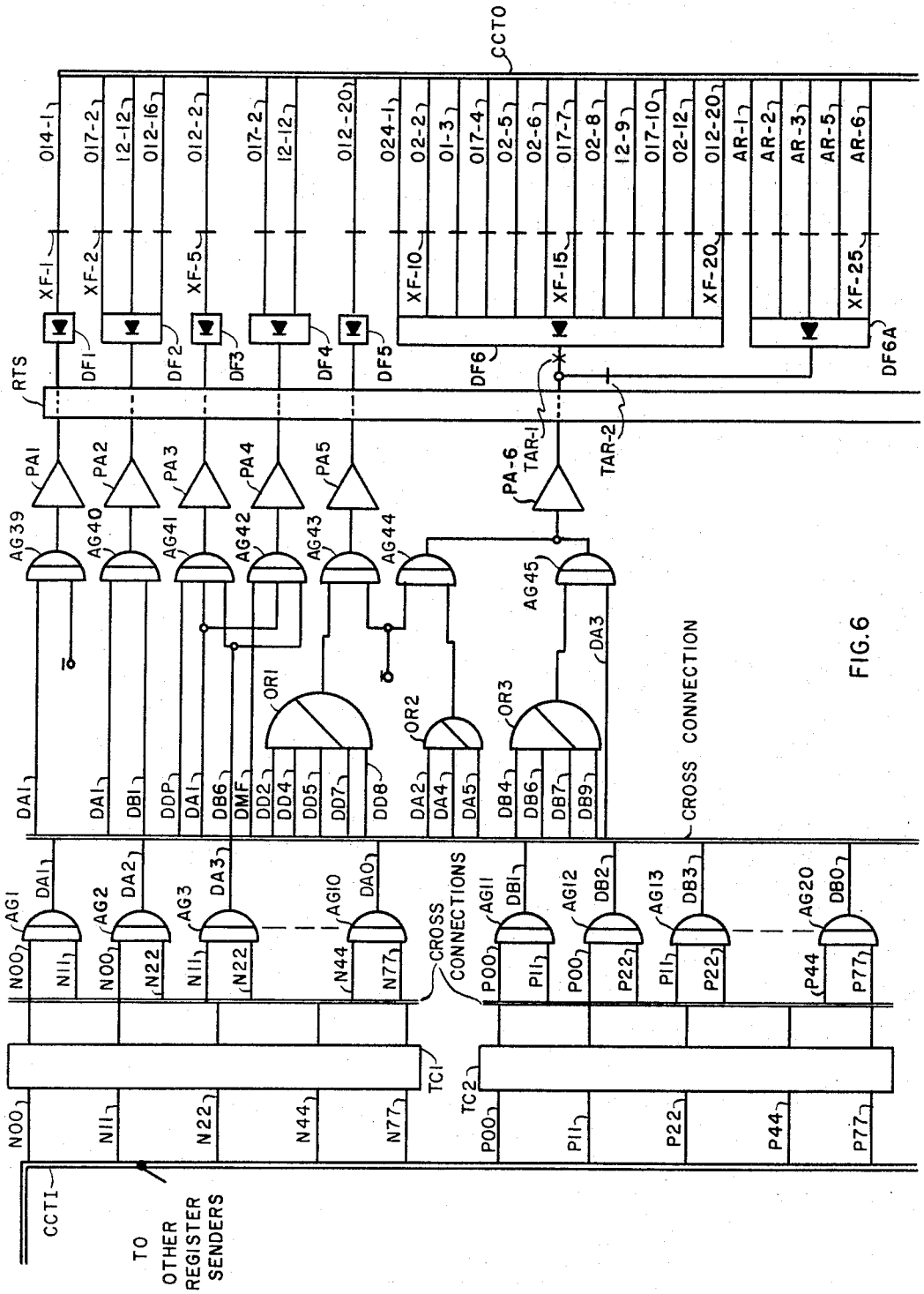
Figure 6A:
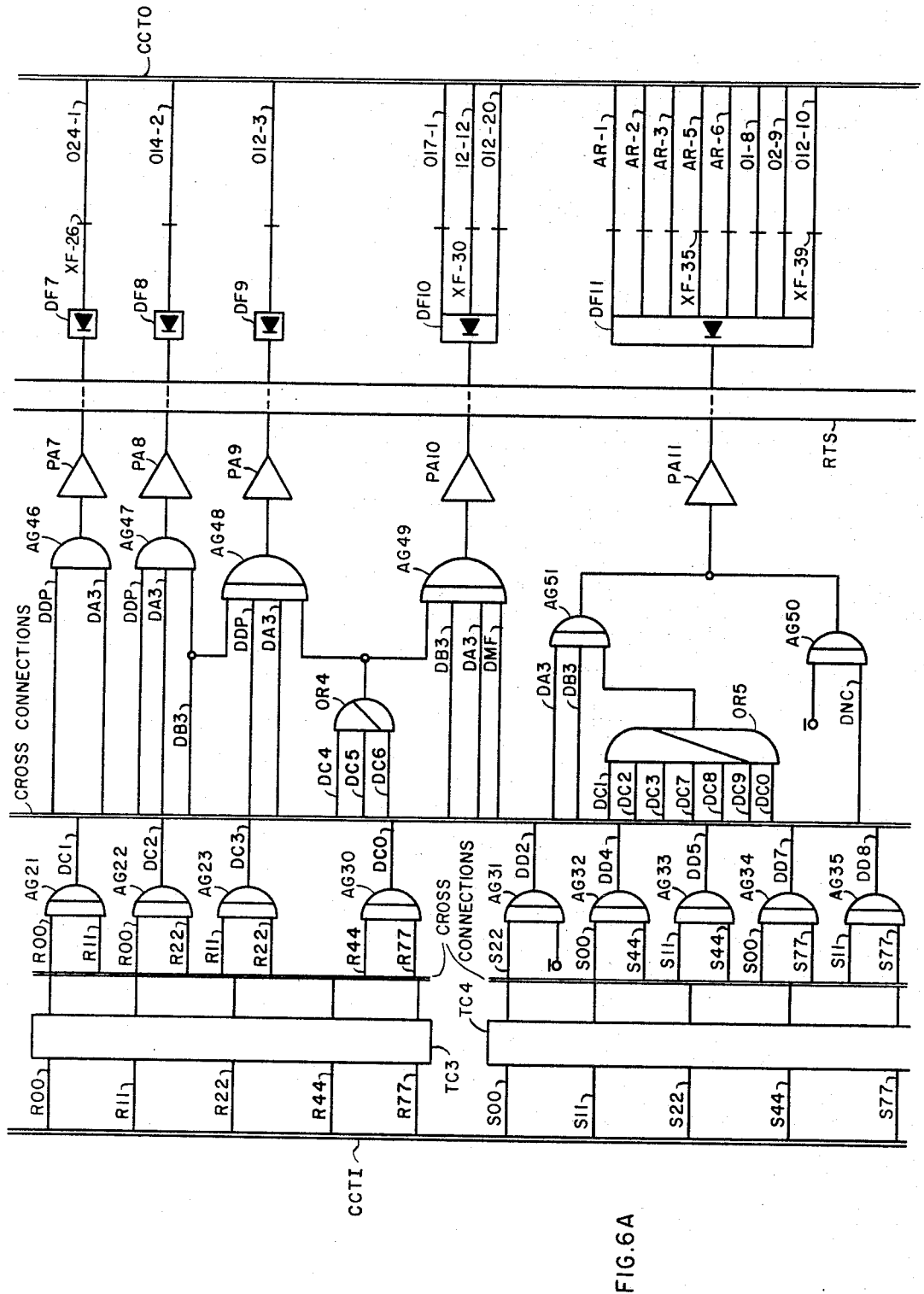
Figure 6B:
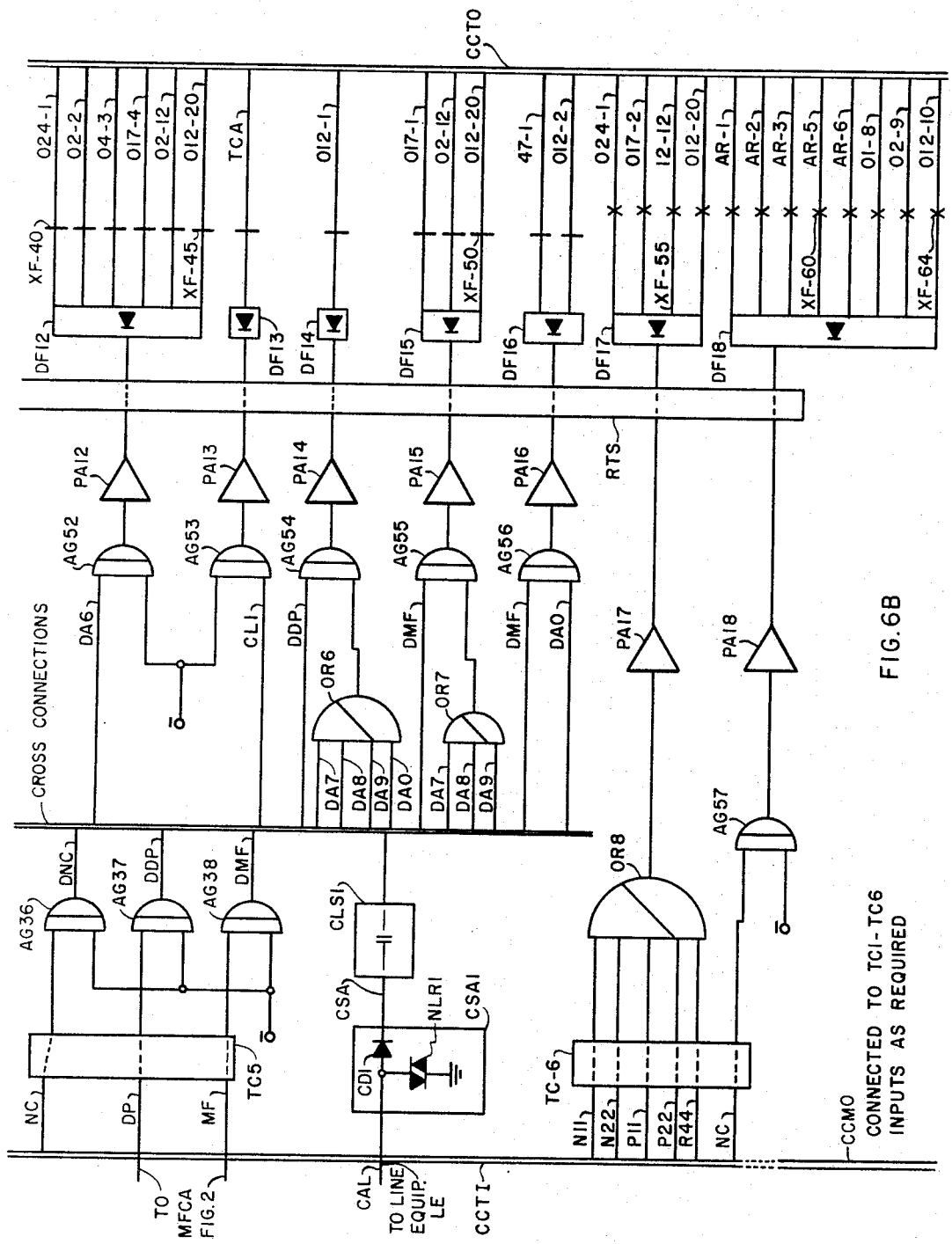

Referring to FIG. 5, the output section of the register comprises a plurality of relay contacts, a series of diodes, and a plurality of output connections. The input connection for commonly driving all of the output connections is by way of lead TB which carries a switched battery potential from the time division power supply TDPS (FIG. 7) during the time slot associated with the register-sender.

Figure 4:
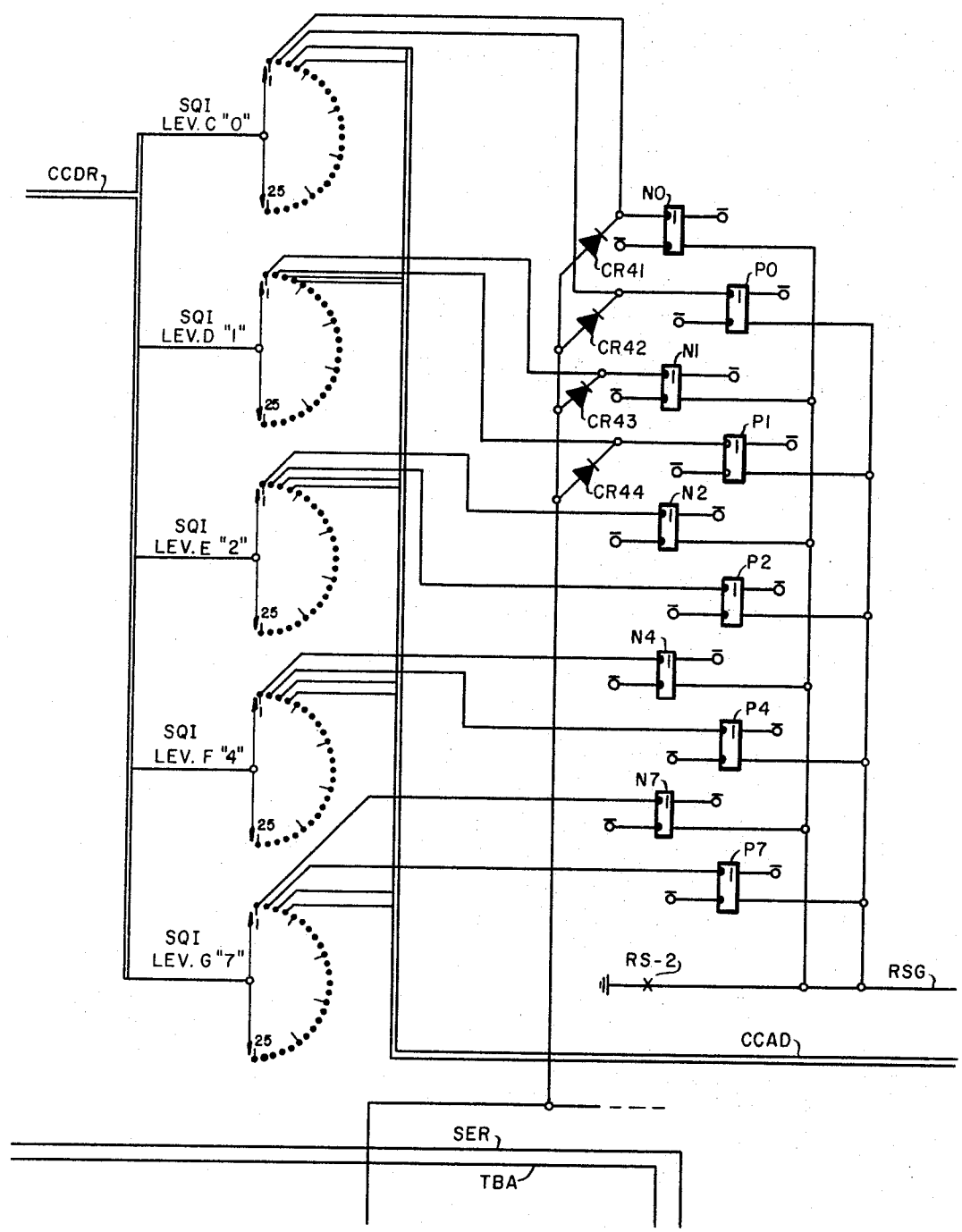

As previously described, the incoming digits are registered on the magnetically latching relays of FIGS. 4 and 5. For simplicity only provision for four digits has been shown. However, additional digits may be stored simply by adding relay groups such as N0–N7 for each digit. Each of these storage relays has a set of contacts which indicate the digit stored. These contacts are shown as N0C–N7C, P0C–P7C, R0C–R7C, and S0C–S7C. Additional storage relays would of course have similar contacts. Present day telephone systems usually require that seven or ten digits be dialed. Therefore, seven or ten relay groups would be needed.

During the time slot associated with the register-sender a switched battery potential is present on lead TB and is extended via contact TD–1 to the contacts of the storage relays. Each of the groups of storage relays will have two contracts closed for each digit stored thereby extending the switched potential on lead TB through the corresponding diodes CR12–CR31 as a multiplicity of coded marks to the input of the translator as illustrated by the cable CCTI. At the same time these coded marks are also placed on positions of levels D, E, F, G, and H of rotary switch SQI as indicated by the cable CCRS and as will be explained in greater detail below.

(7.0) THE TRANSLATOR

In general, the translator in its matrix of gates and cross connections interprets each code stored in the register and recognizes specific code combinations for controlling the register-sender that is registering these codes. For example, the translator will understand from the two-out-of-five to decimal converted section that if the first two-out-of-five code marks are a "1" and a "2", the digit three has been dialed. The MF to D.C. signal converting apparatus MFCA indicates, by way of leads DP and MF, that dialing has been by dial pulses rather than by MF tone signaling and so indicates to the translator at the inputs of the translator commons TC5. The translator combines the first digit "3" and the dial pulse indication "DP" and recognizes that the register-sender should be instructed to open the outpulsing loop for a time that is sufficient to absorb the digit.

The translator gathers information from each associated register-sender and from that information controls each register-sender as each digit is registered. To accomplish this rapidly and efficiently, time sharing is employed. Each register-sender is assigned a specific time slot and each will access the translator with information and receive instructions from the translator only during its own time slot.

In the following operational description of the translator the various inputs to the gate circuits and the like are referenced to the storage relay contacts, gate circuits, or other apparatus from which they are derived. For example, in the converter section AND gate AG11 derives its two inputs P00 and P11 from the contacts P0C and P1C of relays P0 and P1 respectively. Of course, the translator commons TC2 is interposed therebetween however, the translator commons are referenced accordingly. This same referencing follows throughout the translator with the exception of the output leads of the translator. The number or letter portions of the output references which precede the hyphen represent the code of the levels of switch SQO and the numeral portions following the hyphen represent the number of the bank position to which the lead is connected. For example, the lead referenced 017–4 at the output of the encoder section should be understood to be connected to the fourth bank position of levels D, E and H of rotary switch SQO, which by the way is the three-out-of-five code to indicate that routing is complete.

(7.1) *Translator operation*

During the time slot associated with a particular register-sender, switched battery potential is applied via connection TB to the register-sender and switched ground potential is applied via connection TG to that register-sender. Switched battery on connection TB is then extended as a multiplicity of code marks by the closed contacts of the storage relays to the translator commons TC1 to TC6. A combination of these marks, usually two, enables an AND gate of the two-out-of-five to decimal converter and the digit or code is recognized. The outputs of gates AG1 to AG38 are then cross-connected to AND gates AG39 to AG57 and to OR gates OR1 to OR8. This second group of AND gates recognizes a combination of codes and are enabled accordingly.

The outputs of the second group of gates are amplified by power amplifiers PA1 to PA18 and applied via testing apparatus RTS to the diode strap fields DF1 to DF18, where they are connected in multiple to levels D to J of rotary switch SQO of the register-sender via cable CCT0. The wipers of levels D to J of switch SQO are connected to one side of the time division relays T0 to T7 and AR. In the above manner switch battery potential from the translator, as applied to lead TB of the register-sender, has been extended as a multiple translated code to one side of the time division relays. Switched ground, applied to lead TG is on the other side of these relays causing effective operating potentials therefor in accordance with the code from the translator in the form of switched battery potentials.

As a particular example, assume that a local special service telephone call is to be made by a subscriber having a conventional D.C. pulsing telephone subset and the directory number of the called party begins with the digits 11.

When the first digit (1) is dialed, the register-sender marks with switched battery, a two-out-of-five code (N00, N11) to the translator commons TC2. These marks enable AND gate AG1, the output (DA1) of which is applied as one of the inputs to each of two gates AG39 and AG40. Gate AG39 is enabled and its output is amplified by power amplifier PA1 and tested by test switch RTS before being applied to the diode field DF1. This converted switch battery potential is applied to levels D, E and G of switch SQO at the first position in a three-out-of-five code (0, 1, 4) indicating that the next digit should be repeated to the local first selector.

The second digit of our directory number, also a one, is applied to the translator in the same two-out-of-five code only at translator commons TC2. AND gate AG11 is energized by marks P00 and P11 to derive the mark DB1 at its output. This signal, along with the mark DA1, is employed to energize gate AG40, the output of which is amplified by amplifier PA2 and after being tested is applied via diode field DF2 to levels D, E and H of switch SQO in the three-out-of-five code (0, 1, 7) which instructs the register-sender that routing is complete.

The foregoing has been an illustration of the primary translation section of the translator. A secondary or stand-by section, elements TC6, AG57, PA17, PA18, OR8, DF17 and DF18 is available for local and no code calls in the event faults are detected by the monitor MON. The diode strap fields DF1–DF16 are connected to switch SQO via break contacts of relay XF and diode fields D17 and D18 are connected to make contacts of that relay. If a fault occurs, the monitor circuit energizes relay XF and the translator operates on the stand by section.

(8.0) TRANSLATOR INSTRUCTIONS

After the dialed digits have been registered by the register-sender, relays A, PR, B, DB, and BA are operated.

The translator will function as just described to immediately translate as each digit is registered; when sufficient digits are registered as a recognizable code the opening of the appropriate translator gates causes the above mentioned three-out-of-five codes to appear on bank positons of levels D through J of rotary switch SQO. The register-sender "reads" these various three-out-of-five code marks and functions accordingly. The translator furnishes instructions to the register-sender continuously, according to the dialed digits, the sequence state of switches SQI and SQO, and the class of service recognized, and controls the outpulsing of digits and holding of the switch train during the switching portion of a telephone call.

When sufficient digits have been dialed to permit translation, the dialed digits are deleted or resent as instructed by the translator.

In the embodiment described herein the three-out-of-five codes from the translator are tabulated below in Table III, levels D–H of rotary switch SQO being additionally referenced with the code marks they represent (level D is "0", level E is "1", etc.).

TABLE III.—THREE-OUT-OF-FIVE TRANSLATOR CODES

012 Release this circuit
014 Repeat next dialed digit to selector
017 Routing complete—advance for control digit
024 Absorb digit repeated to selector
147 MF Send
027 Hold sending until seventh (or tenth) dialed digit has been registered The above hold-send code (027) may be extended until the tenth digit is registered by strapping positions 7, 8, 9 and 10 of level A of rotary switch SQI.

As information is made available to the translator by the register-sender translation is accomplished and the routing information is available for the register-sender on levels D through J of rotary switch SQO by way of the cable connector CCTO.

Rotary switch SQO steps around its bank contacts to read out the routing information thereon. As previously stated, various routing instructions may be given within the first, say ten, bank positions. Any time the instructions are that routing has been completed, the rotary switch will advance to its twelfth position to receive outpulsing instructions from the translator.

A brief explanation of the outpulsing generator operation is offered here as an aid to understanding the operation of the register-sender as it receives various routing instructions and sending instructions from the translator.

Referring to FIGS. 9, 11, 13, and 14, certain switches or combinations of switches are closed (or open as the case may be) no matter if the instructions from the translator are a two-out-of-five code or a three-out-of-five code. It should be noted that in FIG. 9 either of such codes will cause an operating ground to be extended from BA–13 and a combination of the time division read out relay contacts. Relay SQ will operate. Referring to FIG. 14, a ground potential that will appear at point OG will be extended by way of conductor GE and a combination of contacts of the time division read out relays and the contacts of the counting chain CS1 to CS6 finally appearing at point PP as the operating ground for the blocking oscillator and the outpulsing relay PM. The difference between the two mark and the three mark codes is recognized by other contacts of the time division read out relays; these other contacts generally being located in the upper portion of FIG. 9. As long as a ground exists at point PP the blocking oscillator and relay PM will operate, this action will continue as long as a ground is applied to point PP and different timing and pulsing functions are derived therefrom.

Some of the three-out-of-five code instructions are explained below following the description of the outpulsing circuit.

For an example of the operation of the outpulsing and timing functions, assume that relays T2 and T4 have operated as instructed by the translator. Therefore, contacts T2–7, T2–8, T4–8, T4–9, and T4–5 of the contact array are closed to supply ground to the pulse generator circuit as the counting chain CS1–CS6 counts pulses (FIG. 14).

Since marks on levels F and G of switch SQO are the two-out-of-five code for the digit six in the described embodiment, the outpulsing loop will be opened and closed six times as is next described.

Figure 12:
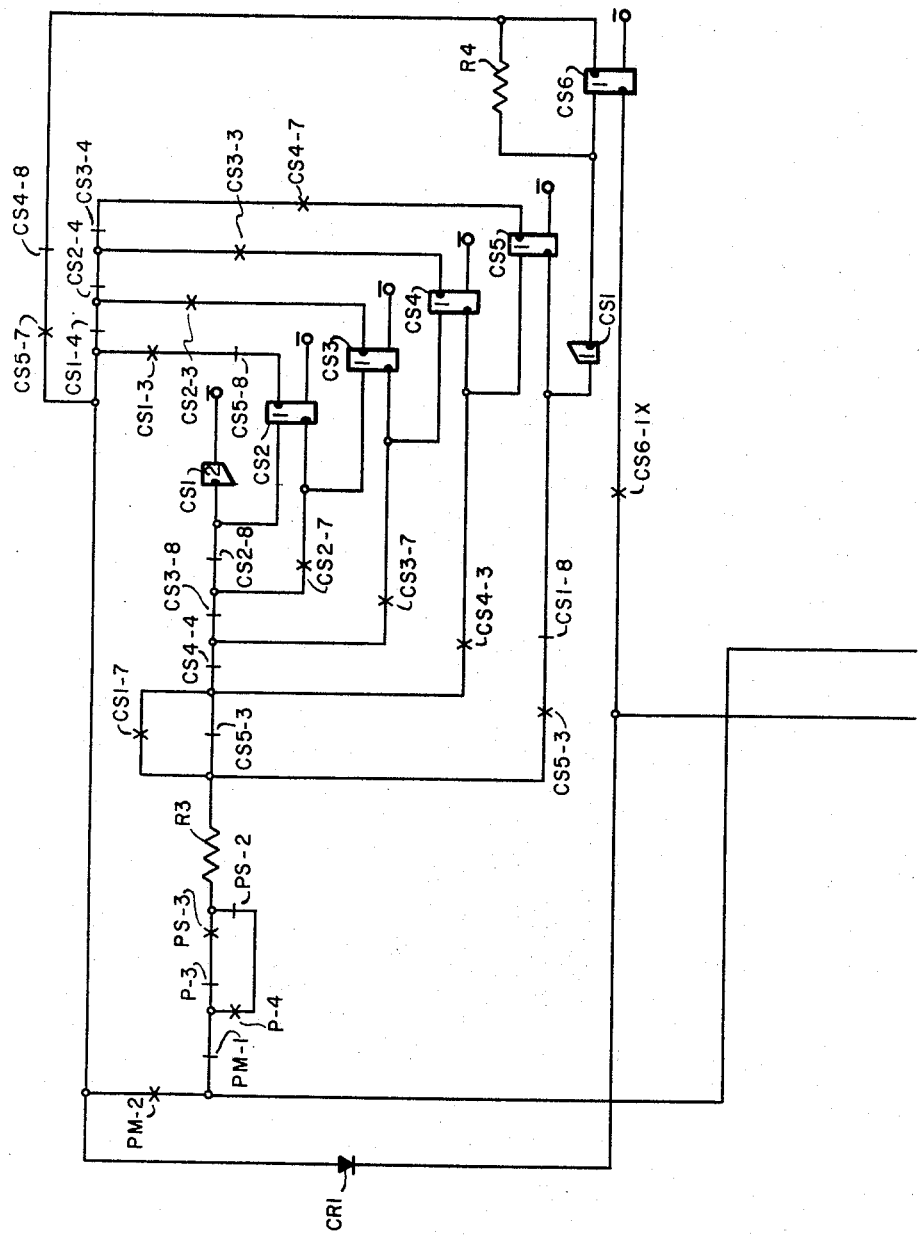
Figure 13:
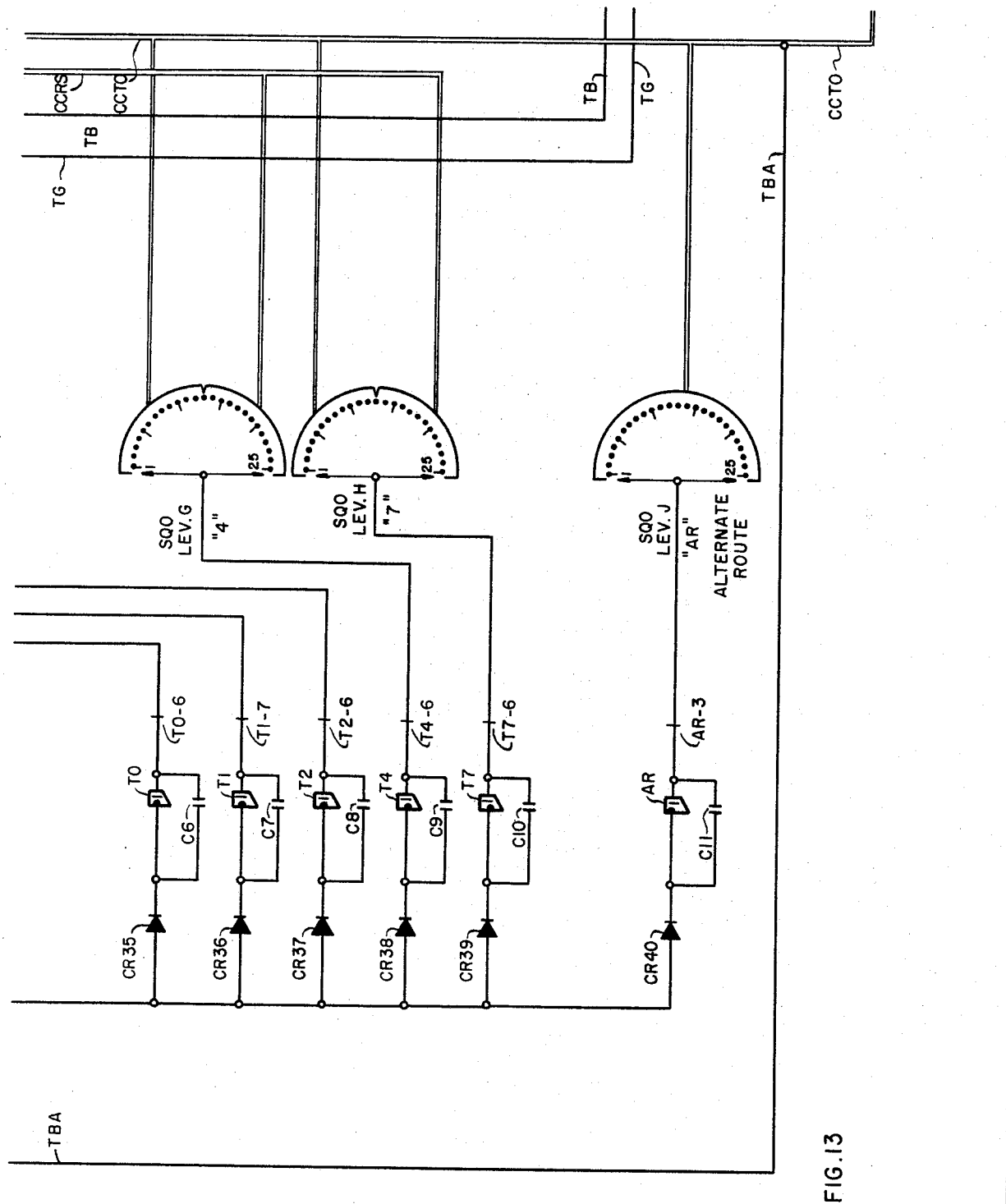

The outpulsing generator, at winding 1 of relay TR, receives an operating ground via BA–12, BUSY–2 key, PC–1, SQ–6, P–2, PULSE TEST–2 key and begins to operate. Relay PM connected to the same ground follows the operation of the pulse generator. The same ground circuit is also connected to PM–1 and PM–2 (FIG. 12).

Relay PM operates closing ground via PM–2, diode CR1, point PG, PS–7 and diode CR3 to winding 1 of relay P. At the same time contacts PM–3 open the outpulsing circuit.

Relay P operates on winding 1 closing contacts P–5 and the ground thereon to short winding 1 of relay PS the time control relay. The "X" contacts P–1X close a knock down path for relay P as will be explained below. Contacts P–7 close a holding ground path to relay P via AS–3, DS–3, AB–3 and the relay contact array during pulsing. Contacts P–4 close preparing a ground path from PM–1 (open at this time) via resistance R3 to operate the counting chain CS1 to CS6. Contacts P–2 open the ground circuit to the pulse generator and relay PM, however, ground is still supplied via PM–2, diode CR1 and diode CR4.

The pulse generator and relay PM restore. Contacts PM–3 close the outpulsing loop completing the first pulse. Ground from point OG via PM–1, P–4, PS–2, R3, CS5–3, CS4–4, CS3–8 and CS2–8 operates relay CS1. Ground is extended from point OG to points PG and PP for relay P and the outpulse generator via CS6–2, T2–7, CS1–2, AB–3, DS–3, AS–3 and P–7. Also, ground from point PG is supplied via diode CR4 to point PP to keep the pulse generator and relay PM operating.

The pulse generator and relay PM reoperate. Contacts PM–2 supply ground via CS1–3 and CS5–8 to hold relay CS1 operated by its winding 2 and to operate relay CS2 on its winding 1 in series therewith. Contacts PM–3 again open the outpulsing loop.

The pulse generator and relay PM restore. Contacts PM–1 close ground via a path including resistance R3 and contacts CS2–7 to hold CS2 operated on its winding 2. Ground is supplied from point OG to point PG and point PP to keep relay P operated and the pulse generator operating, respectively, via T4–5, CS2–5, AB–3, DS–3, AS–3 and P–7. Contacts PM–2 remove the holding ground on relay CS1 winding 1 and it restores. Contacts PM–3 recloses the outpulsing loop to complete the second pulse.

The pulse generator and relay PM reoperate. Contacts PM–3 open the outpulsing loop. Contacts PM–2 supply ground from point OG to hold relay CS2 winding 2 and operate relay CS3 by its winding 1 via CS1–4 and CS2–3.

The pulse generator and relay PM restore. Contacts PM–1 place a holding ground on winding 2 of relay CS3 via a path including resistance R3 and contacts CS3–7. Ground is now being supplied to hold relay P and keep the pulse generator operating from point OG via contacts T4–5, CS3–5, AB–3, DS–3, AS–3 and P–7. Contacts PM–3 close the outpulsing loop to complete the third pulse.

The immediately foregoing procedure continues until there is no continuity between the contacts of the time division readout relays and the counting chain relays (CS1 to CS6) in the relay contact array which permit ground to hold relay P and keep the counting chain operated. In this example, it would be when relay PM restores the sixth time.

At the end of the count, the pulse generator and relay PM stop cycling. This removal of ground from the CR3 side of winding 1 of time control relay PS allows relay PS to operate in series with winding 1 of relay P. Contacts PS–7 open and PS–8 close making winding 2 of relay P to be in magnetic opposition to winding 1 of relay P and causing relay P to be restored. Contacts P–4 and PM–2 open the ground circuit to the counting chain and the counting chain restores. Contacts P–2 close preparing the pulse generator input circuit for timing the interdigital pause. Contacts P–6 open the short across winding B relay SD.

When relay PS operates contacts PS–6 break the holding circuit on the time division relays windings 2 and contact PS–1 open between the TG lead and the time division relays windings 1. Contacts PS–10 short out contacts PM–4 and keep the outpulsing loop closed. Contacts PS–5 partially complete the operating ground circuit between points OG and PG.

When the time division relays restore (in this example contacts T2–1 and T4–2 open), the relay SQ restores opening contacts SQ–4 deenergizing motor magnet MMO and causing the switch SQO to step to the next position.

Contacts SQ–6 again supply the initial ground to start the pulse generator operating to time the interdigital pause. The pulse generator, relay PM, and CS1 to CS6 function as during the outpulsing procedure. However, now relay PS is operated instead of relay P.

The pulse generator and relay PM drive the counting chain until relay CS6 operates. When relay CS6 operates contacts CS6–2 open and break the ground path including contacts SQ–1 and PS–5 which supplies ground to point PG from point OG. The pulse generator stops and relay PM restores. Relay PS restores. Contacts PM–2 and PS–3 open removing ground from the counting chain relays which also restore.

The above has explained outpulsing of a digit and timing of an interdigital pause. The remainder of the digits and pauses are processed in the same manner under the control of the translator. In other instances counter CS1–CS6 operates for three-out-of-five codes; however, no outpulsing occurs since the effect of contacts PM–3 will be negated at that time or employed for other purposes.

(8.1) *Interdigital release of register-sender*

It should be assumed that relays A, PR, B, BB and BA are operated.

The translator, interpreting a need for an interdigital release sends a three-out-of-five code to the register-sender, that is relays T0, T1 and T2 are signalled to operate.

Switched battery is coupled to one side of the time division relays via levels D, E and F of rotary switch SQO and switched ground is applied via terminal TG and contacts TD–3, SD–1, DS–6, PS–1, BA–14 and diodes CR35 to CR40, respectively. Windings 1 of relays T0, T1 and T2 pull the "X" contacts T0–5X, T1–6X, and T2–5X, respectively, and apply ground via those contacts BA–13 and PS–6 to fully operate T0 to T2 on their second windings. Contacts T0–6, T1–7 and T2–6 open the circuit to the first windings.

Contacts T0–1, T1–3 and T2–1 extend ground from BA–13 to operate relay SQ. Contacts SQ–3, T0–2, T1–2 and T2–9 close in series with BA–13 to extend a ground to winding 2 of relay RL. Contacts SQ–2 close motor magnet MMO to ground via AT–4, AR–2, AS–2 and BA–13. Magnet MMO is energized.

Relay RL operates on its winding 2 and locks via RL–5. Contacts RL–3 place ground on terminal G and RL–6 opens lead H from the linkfinder causing a relay in the link circuit to effect an open loop to relay A. Contacts RL–1X short out the pulsing control of the outpulsing loop. Contacts RL–10 extend ground via lead PC to a peg count meter.

Relay A and its follower, relay PR, restore opening PR–2 to deenergize relay B. Contacts PR–1 operate relay C. Contacts C–2 close ground from B–5 to operate relay CB. Contacts B–5, C–1 and CB–7 extend ground to operate relay BB. Contacts CB–4 extend ground from BB–5 to energize motor magnet MMI.

After a time delay caused by its slow-to-release characteristic, relay B restores at contacts B–3, B–5 and B–2, and opens the circuits of relays C, CB, BB and BA which restore. Relay BA in restoring causes all other relays except relay RL to restore.

Rotary stepping switches SQI and SQO step to their respective normal positions by a self-interrupted action via their contacts IIN–1 and OON–1.

Relay RL winding 1 is closed in magnetic opposition to winding 1 when the off-normal contacts of switches SQI and SQO close at their home positions and relay RL restores.

The subscriber dials the balance of digits directly into the switch train.

Contacts RL–9 operate relay RS on its winding 2 to reset the magnetically latching relays via a ground through contacts RS–2 (FIG. 4).

Referring to Section 8.0, it was noted that the conjunct operation of relay SQ and a two or three mark code would cause the outpulsing generator to function. Outpulsing during release is overcome however by the shorting action of contacts RL–1X as the generator operates.

(8.2) *Absorbing digits*

When a digit that is repeated to the selector is one which does not result in a code permitting an early release of the register-sender, the register is signalled by the translator to provide a timed open loop to the selector, thus absorbing the digit.

Switched ground potential on terminal TG and switched battery potential on levels D, F, and G of switch SQO cause relays T0, T2, T4 and SQ to operate as previously described.

The operation of relay SQ causes contacts SQ–6 to close an operating ground circuit to relay PM and the pulse generator. Contacts BA–13, SQ–3, T0–2, T1–1, T2–2, T4–7 and T7–2 form a ground path for winding 2 of relay AB.

Relay AB operates and opens the outpulsing loop at contacts AB–2. The outpulsing generator operates for a predetermined time, as will be explained below, during which relay contacts P–6 short out winding B of relay SD and contacts PS–9 place ground via DS–7 and AB–6 to winding 2 of relay AB and contacts PS–1 and PS–6 open the circuit to relays T0, T2 and T4 causing those relays to restore and open the circuit to relay SQ which restores.

After the counting chain (CS1 to CS6) times the open loop, relays PS, AB, PM and the counting relays restore and again close the outpulsing loop.

(8.3) *Routing complete*

Relays A, PR, B, BB, BA are assumed operated.

Switch ground is again transmitted from the translator to terminal TG and switched battery is present on levels D. E and H of switch SQO. Relay T0, T1, T7, and SQ operate as previously described.

Contacts SQ–6 supply ground to the outpulsing circuitry. Contacts SQ–2 close to again energize motor magnet MMO. Contacts SQ–3, T0–2, T1–2 and T7–10 close in series with BA–13 to supply ground to winding 1 relay AS.

Relay AS operates and closes an alternate path in the outpulsing loop at contacts AS–5. Contacts AS–1X close a short circuit on winding 2 relay AS and winding 2 relay AT. Contacts AS–2 open the energizing circuit to motor magnet MMO, deenergizing MMO and causing switch SQO to step to the next position. Contacts AS–6 close ground to motor magnet MMO via switch SQO level C and OIN–1 contacts. Switch SQO steps self-interrupted to the, say twelfth, position and stops.

The outpulsing circuit operates as before and when relay PS operates contacts PS–6 release the time division relays, which in turn release relays SQ and AS which has a slow-to-release slugging effect via contacts AS–1X.

Contacts AS–4 furnish a path to operate relay AT winding 1 in series with relay AS winding 1. Contacts AT–1X close an alternate path in the outpulsing loop.

The outpulsing generator and associated circuitry function as before to provide the interdigital pause when relay SQ restores opening contacts SQ–6 and closing contacts SQ–5.

The digit transmitted to the twelfth bank contacts of SQO controls the sending of the dialed digits. For example, digit "3" causes the sender to delete the first and second dialed digits, the digit "2" causes the first dialed digit to be deleted, and the digit "1" permits the sender to send the remainder of the dialed digits after which the register-sender is released.

(8.4) *Hold sending*

In a manner previously described relays T0, T2, T7 and SQ are operated.

Contacts SQ–3, T0–2, T1–1, T2–2 and T7–7 connect ground from BA–13 to winding 1 relay DS in series with winding 1 relay AB. Contacts SQ–2 again close to energize motor magnet MMO. Contacts SQ–6 again supply the initial operating ground to the outpulsing circuitry.

Relay DS operates and contacts DS–6 open lead TG, the switch ground connection to the time division relays. Contacts DS–3 opens a ground path in the counting chain contacts.

Relay AB operates and locks via BA–11, level A of rotary switch SQI, AB–5, DS–5 and winding 1 relay DS. Contacts AB–1X and DS–1X short circuit the outpulsing loop to hold the selector circuit, say until the seventh digit has been registered, or if bank contacts eight, nine, and ten of level A are connected to contacts seven, until ten digits have been registered.

The register-sender functions as per Sections 3.0 through 4.1 except as will be described below.

The counting chains operate as previously described, however, the outpulsing loop is short circuited and outpulsing is prevented at this time.

After the seventh (or tenth) digit has been dialed relay A reoperates energizing relay PR which also operates. Relay B is still operated due to its slow-to-release characteristic.

After its slow-to-release interval, relay C restores and marks the levels C to G of switch SQI and energize the corresponding storage relays according to the digit dialed.

The opening of contacts C–2 causes relay CB to restore and deenergize motor magnet MMI by opening contacts CB–4. Rotary switch SQI steps to the eighth (or eleventh) position opening the circuit at level A to relays DS and AB.

Relays DS and AB restore removing the short (DS–1X and AB–1X) across the outpulsing loop and reclosing terminal TG to the time division relays.

Succeeding digit repetition is controlled by the translator.

(8.5) *Alternate route*

Terminal TG and level J of switch SQO have switched ground and switched battery applied thereto, respectively. Relay AR operates on winding 1 sufficiently to close contacts AR–1X and fully operate on winding 2 via BA–13 and level B of switch SQO.

Contacts AR–5 close ground from BA–13 to operate relay SQ. Contacts AR–4 close ground to operate relay AB on its winding 1.

Relay AB opens the outpulsing loop at contacts AB–2 and opens a ground path in the counting chain at contacts AB–3.

Relay SQ contacts SQ–4 close to energize motor magnet MMO via level B switch SQO, AR–1X, CR32 and OIN–1 contacts. Switch SQO steps self-interrupted to position four where energizing ground is removed from the motor magnet and other routing instructions are received.

Contacts SQ–6 again start the outpulsing generator and the circuit functions in a similar manner as previously discussed except relays AB and AR are operated.

The remainder of the digits are resent and the register-sender is released.

In the present embodiment an alternate route command may be derived in several ways. Referring to FIGS. 6, 6A, 6B and 7, relay TAR is connected to and controlled by the trunk groups. If the selected group is busy, the ATB lead loses its ground and relay TAR restores. Contacts TAR–1 open and TAR–2 close (FIG. 6) to place the AR code on the banks of switch SQO.

Assuming that a local call is identified by the first dialed digits as three-three-six, which would for D.C. pulsing subsets open gates AG46, AG47, AG48, and OR4 to instruct the register-sender to open the outpulsing loop to absorb the first digit, repeat the next dialed digit, and release. However, suppose the subscriber misdials the number and dials three-three-seven. Now gates OR5 and AG51 operate instead of AG48 and alternate route instructions are employed via amplifier PA11 and diode field DF11. The same function occurs for a no code via gate AG50.

In the standby section of the translator (TC6, OR8, AG57, PA17, PA18, DF17, and DF18) a no code will effect an alternate route, digits one and two, and then release.

(8.6) Repeating the next dialed digit

With the register-sender operating as previously described, and a particular dialed digit value and sequence location tell the translator to instruct the register-sender to repeat the next dialed digit to the selector, the translator extends the code 014 to rotary switch SQO. Relays T0, T1, and T4 operate.

Briefly, contacts T0–2, T1–2, and T4–10 close an operating ground from BA–13 to winding 2 of relay DS. Relay DS operates and opens contacts DS–2 placing contacts A–2 of the initial repeating relay A in series with the outgoing loop (+0, −0). Contacts A–2 repeat the next dialed digit to the selector. Contacts DS–6 open the readout relays to prevent reading during digit repeating. The interdigital pause allows the register-sender and the translator to continue operation as before.

(9.0) DIGIT DELETING

Referring now to FIG. 5, as previously mentioned there is a second set of outputs from the register to the sender portion of the register-sender by way of cable connector CCRS which extends from FIG. 5 through FIG. 9 to FIGS. 11 and 13 where these various connections are made starting with the thirteenth bank position of levels D through H of rotary switch SQO. For example, the first digit is connected to position thirteen, the second to fourteen and so on as required.

Assuming that routing has been completed and that all routing instructions from the translator have been followed by the register-sender, and that rotary switch SQI now has its wiper arms positioned on the twelfth bank position, the translator will furnish the register-sender with a control digit which instructs the register-sender how many of the first dialed digits, if any, it should delete in sending. The digit "1" instructs that all digits should be sent; the digit "2" instructs to delete the first dialed digit; and digit "3" instructs to delete the first and second dialed digits. It will be easily seen later that a furtherance of this deleting scheme may be carried out by employing additional digits.

Assume that a two-out-of-five code for the digit three is placed on the banks of switch SQO. The first two dialed digits, positions thirteen and fourteen, must be deleted.

Relays T1 and T2 will be energized as previously described by a switched ground on lead TG and the multiple switched battery codes via the translator.

Contacts T1–3 and T2–1 close ground from BA–13 to operate relay SQ. Contacts SQ–2 close to energize motor magnet MMO. Contacts SQ–6 start the outpulsing generator causing contacts PM–3 and PM–4 to start opening and closing the outpulsing loop.

With ground on the left-hand side of relay AT winding 1 via BA–13, and ground on the right-hand side of the same winding via BA–13, T0–2, T1–2, T7–10 and AS–4, relay AT is shorted and cannot operate. When switch SQO steps to the twelfth bank position and relays T0, T1 and T7 release, the last-mentioned ground is removed and relay AT operates over the path comprising ground, contacts BA–13, winding 1 of relay AT, contacts AS–4 and winding 1 of relay AS to negative potential. When relay SQ reoperates due to the operation of relays T1 and T2, as just described, ground is extended from BA–13 via SQ–7, AT–2 and diode CR8 to hold relay AS on its winding 1 and via AT–3 and AS–1X to hold relays AS and AT on their other windings. Relay AT contacts AT–6 open the outpulsing loop and contacts AT–7 extend ground via PM–4, AT–5, and SQ–2 to energize and deenergize motor magnet MMO as the outpulsing circuit operates.

The outpulsing circuit will lose its ground at point PP after counting the digit three and will stop. The rotary switch SQO will have its wipers on the fifteenth bank position.

When relay PS operates after the timing sequence, contacts PS–6 open the time division readout relays, which restore and cause all other relays just-operated to restore. The register-sender is now ready to resend the remainder of the digits as required.

(10.0) DIGIT OUTPULSING

In resending dialed digits as marked on the rotary switch bank contacts by way of connector CCRS, the two-out-of-five digit codes in the form of switched battery potentials are placed on one side of the time division read out relays T0–T7. Switch ground is also applied via lead TG from the time division power supply TDPS to the other side of these read out relays via contacts TD–3, SD–1, DS–6, PS–1, BA–12, and diodes CR35–CR39. Assuming that the digit 6 is to be resent, represented by the two-out-of-five code "2 and 4," switched battery potentials are applied to the number one windings of relays T2 and T4, switched ground potentials being applied to the other side of these relays as just described. Relays T2 and T4 operate sufficiently on their number one windings to close their contacts T2–5X and T4–1X (FIG. 9) and fully operate their number two windings via the ground supplied through contacts BA–13 and PS–6. Contacts T2–1 and T4–2 close this same ground from BA–13 to operate relay SQ.

Relay SQ operates and contacts SQ–2 close another ground path from contacts BA–13 through contacts AS–2, AR–2, AT–4, and SQ–2 to energize motor magnet MMO of rotary switch SQO. Contacts SQ–6 (FIG. 14) close a ground from contacts BA–12 through the BUSY–2 key and contacts TC–1, SQ–6, P2, and PULSE TEST–2 key to energize relay PM and further via the same path and resistance R8 to winding 1 of springless relay TR and the base of transistor Q1 of the blocking oscillator. The oscillator starts and relay PM operates and restores following the oscillator operation. It should be noted that contacts PM–1 and PM–2 (FIG. 12) are very similar to contacts PR–3 and PR–4 which were used in advancing the incoming counting chain CD1 to CD6. Contacts PM–3 open the outpulsing loop connection from lead (+0).

Contacts PM–1 and PM–2 cause the counting chain CS1 to CS6 to operate in a manner similar to that of the relay counting chain CD1 to CD6. Contacts PM–2 when closed also supply ground from contacts BA–12 via BUSY–2 key, PC–1, and point OG, through diode CR1, to point PG where on the one hand it is applied through contacts PS–7 and diode CR3 to the number one winding of relay P.

Contacts PM–1 and PM–2 also open and close to supply ground and holding grounds to relays CS1 through CS6 as previously described for relays CD1 to CD6, and to open and close the outpulsing circuit at contacts PM–3. Ground potential at point PP affords this action. However, ground at point DP was supplied via contacts B–5 and C–1. In the case of point PP, the ground potential is supplied from contacts BA–12 via BUSY–2 key, PC–1, P–7, and diode CR4 along with the conjunct operation of a combination of relays AR, T0 to T7 and CS1 to CS6. Each time the outpulsing generator is to operate, the operating ground must be supplied by correlation of the counter operation and the readout relay contacts operated by the switched battery marks in the form of two-out-of-five code from the magnetically latching storage relays. Since the digit "six" is to be outpulsed, this correlation will exist until the sixth operation of relay PM after which relay PS operates and controls the interdigital timing function. Contacts PS–6 open to restore relays T2 and T4 which in turn cause relay SQ to restore deenergizing motor magnet MMO when contacts SQ–2 open. Motor magnet MMO steps switch SQO to the next position to read the next digit or until outpulsing of all digits has been completed.

(11.0) MULTIFREQUENCY SENDING

Assume as before that relays A, PR, B, BB and BA are operated.

The translator, when interpreting that MF signals should be sent rather than D.C. pulses, marks levels E, G, and H of rotary switch SQI with switched battery potentials, and as previously explained, relays T1, T4, and T7 will operate. The sequencing of switch SQO is much the same as before. However, the ground from BA–13 and SQ–3 is extended over the connection MFSC through contacts T1–4, T4–3, and T7–3 to the MF START lead and the multifrequency sender MFSEND. As the switch SQO travels in the outpulsing sequence contacts T0–10, T1–10, T2–10, T4–11, and T7–11 instruct the MF sender MFSEND as to what digits should be sent.

Figure 8:
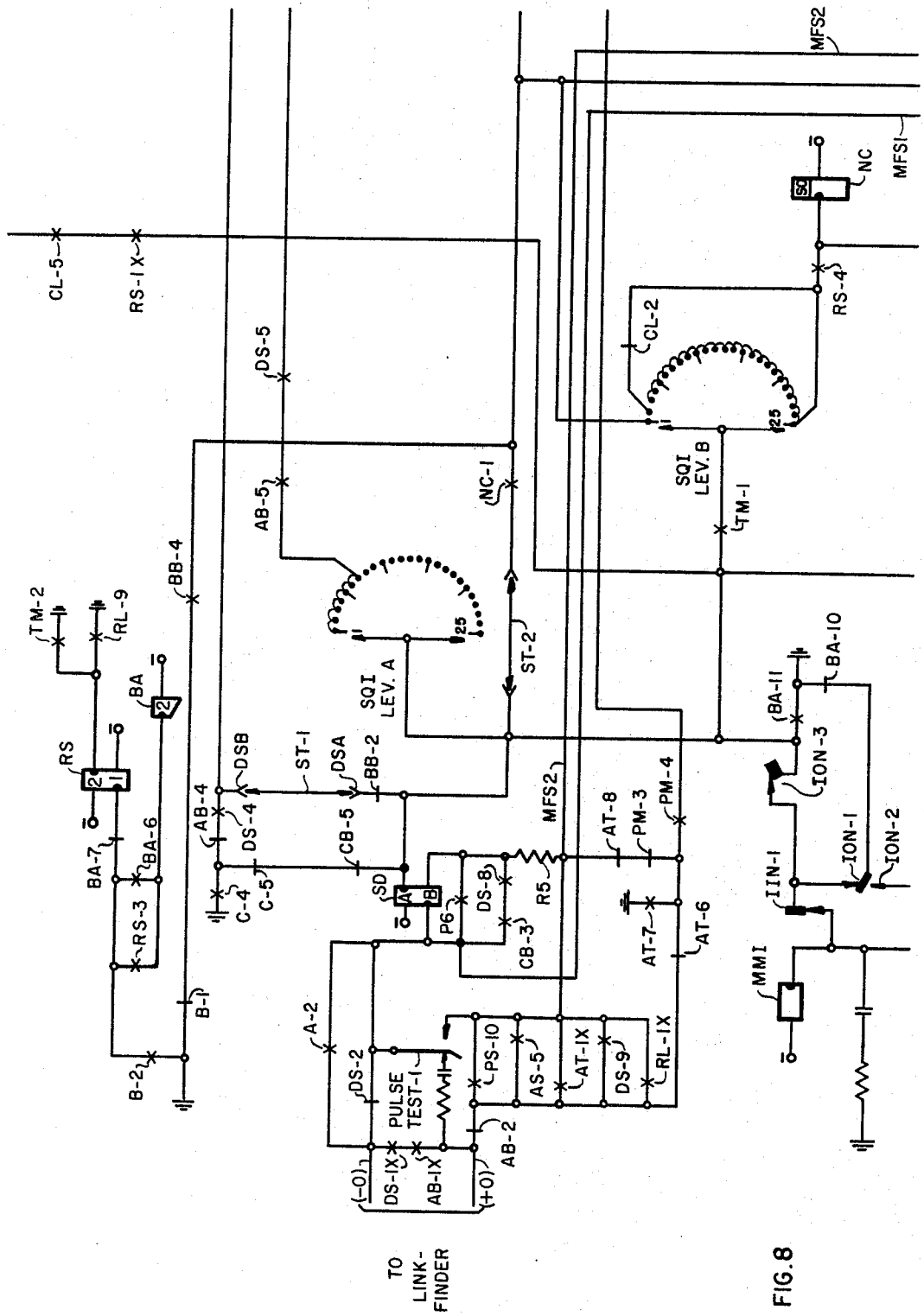
Figure 9:
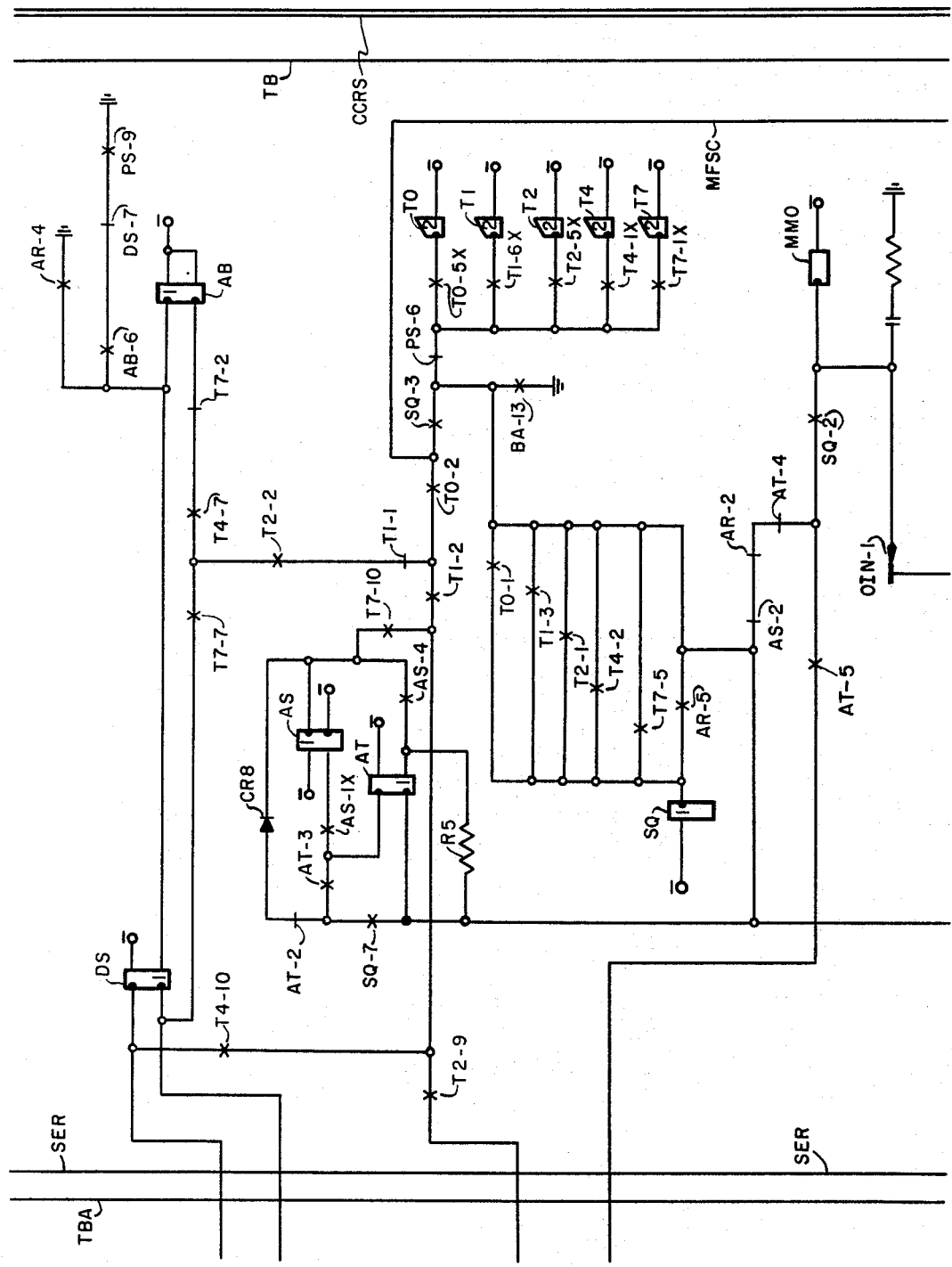
Figure 10:
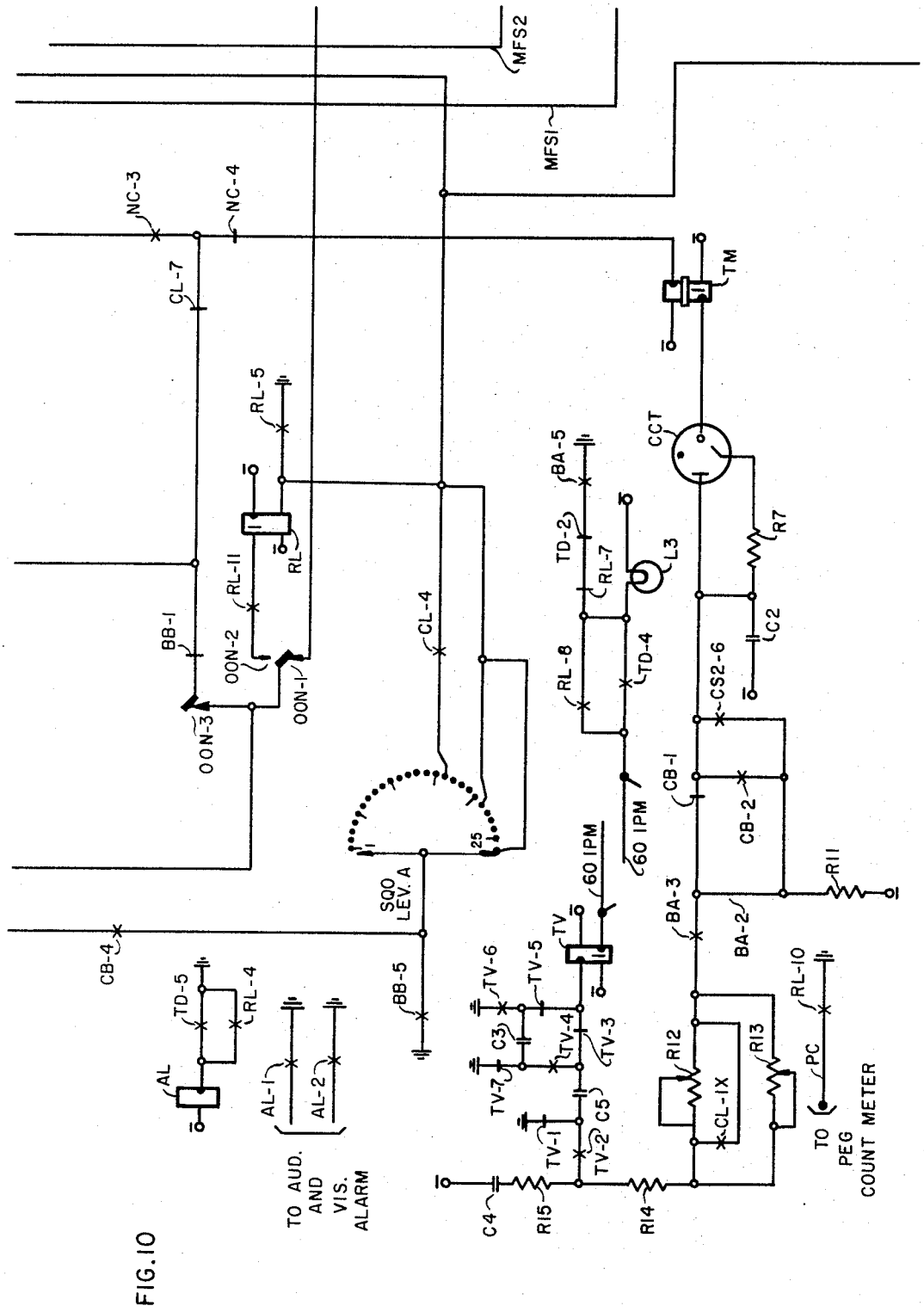

The output of the MF sender is connected, by way of connections MFS1 and MFS2 across FIGS. 10 and 8, across contacts P–6 and resistance R5.

During sending contacts P–6 short out winding B of relay SD and contacts AT–1X complete the multifrequency "outpulsing" path to leads (+0) and (–0). Contacts AT–6 and AT–7 override the outpulsing contacts PM–3 and sequence motor magnet MMO therefrom, respectively.

After MF sending, the register-sender will function as before and initiate a release sequence.

(12.0) RELEASE OF REGISTER-SENDER

Assume that relays A, PR, B, BB, BA and some of the storage relays are operated.

When the level A wipers of switch SQO of this specific embodiment are advanced to the twenty-first position, in the present embodiment, ground potential is extended via BB–5 and level A to operate relay RL on winding 2. Contacts RL–10 close to a peg count meter. Contacts RL–1X close an alternate circuit in the outpulsing loop. RL–3 ground terminal G as previously described. Contacts RL–7 and RL–8 transfer lamp L3 from direct ground to interrupted ground and contacts RL–6 open terminal H and remove the ground via terminal H to the link access circuitry.

A relay in the access circuitry restores from the loss of ground and opens the circuits to leads (+1) and (–1), thus opening the loop to relay A which restores. Contacts A–1 open deenergizing relay PR which restores. Contacts PR–1 close and PR–2 open energizing relay C and deenergizing relay B, respectively.

Relay C operates and energizes relay CB via B–5 and C–2.

Relay CB operates and closes contacts CB–4 to energize motor magnet MMI. Relay BB also operates via B–5 and CB–7.

Relay RS operates and resets the storage relays by magnetically opposing the magnetic latching action with a ground on windings 2 of each via contacts RS–2.

After its slow-to-release interval, relay B restores opening circuitry to relays C, CB, BB and BA which also restore. Relay BA in restoring causes all relays except RL and RS to restore and closes ground to motor magnet SQI via BA–10, ION–1, and IIN–1 to energize motor magnet MMI. Rotary Switch SQI steps self-interrupted to its normal position closing contacts ION–2 and ION–3 and opening ION–1. Ground is then extended from BA–10 via ION–2, OON–1, diode CR32 and ION–1 to energize motor magnet MMO and cause switch SQO to step self-interrupted to its normal position.

When SQO is at normal, ground is extended from BA–10 via ION–2, OON–2, and RL–11 to winding 1 of relay RL energizing winding 1 in magnetic opposition to winding 2 and causing relay RL to restore opening contacts RL–9 to remove ground from winding 2 of relay RS which restores. The register-sender is now at rest.

(13.0) TYPES OF CALLS

During the time between seizure and registering of digits relays A, PR, B, BB, and BA are operated.

(13.1) *Zero dialed digit*

Zero calls are arranged for a, say five second, timing to distinguish from zero-plus calls, after which a routing is sent in accordance with strapping in the register-sender. Provision for translating zero calls within the register-sender affords maximum protection against service failure on calls to the operator. Optionally, zero calls may be routed by the translator.

The register-sender operates the same as in Section 4.2 except that after the last pulse of the digit 0, when relay C restores to mark the levels of rotary switch SQI, level H of switch SQI is marked as well as levels F and G. This mark is from B–5 via C–3, CB–6, CD6–3 and CD5–6. This mark on position 1 of level H extends ground to the serially connected windings of relay CL.

Relay CL operates its "X" contacts CL–6X closing a multiple ground to relay CL and "X" contacts CL–1X short circuit resistance R–12.

Relay TB is normally cycling from the 60 IPM interrupted ground. When at normal or in an unoperated condition relay TV allows capacitors C13 and C15 to each charge to, say 50 volts, C13 via TV–7, TV–5 and winding 2 of relay TV, and C15 via TV–1, TV–3 and winding 2 of relay TV. However, when the above contacts open and contacts TV–2, TV–4 and TV–6 close, capacitors C3 and C5 are effectively two series EMF's of 50 volts each or a total EMF of 100 volts. This 100 volts is connected via TV–2, R14, variable resistance R13, BA–3, CB–1 and gas tube CCT to the relay TM winding 1. If there is a sufficient delay before a digit is dialed or between digits gas tube CCT fires allowing a potential difference of 100 volts across winding 1 to operate relay TM, winding 2 of relay TM having only one-half that potential in opposition applied via BA–11, CL–7, and NC–4.

Contacts TM–1 place a ground from BA–11 on the wipers of SQI level B. Contacts TM–2 close a ground on winding 2 of relay RS which operates to short circuit winding 2 of relay RS which operates to short circuit winding 1 of relay CL by its contacts RS–6B. Contacts RS–2 close to reset the storage relays.

Relay CL fully operates and opens contacts CL–7 to remove ground from winding 2 of relay TM.

Relay RL operates on winding 2 thereof from the ground applied via BA–11, TM–1 and level B position 1 of rotary switch SQI. The circuit now functions as it did for interdigital release described in Section 8.1.

(13.2) *CLR calls*

If the code is a CLR call, and no time out is required to recognize zero-plus calls, or no translation is required, the circuit will function as it did in Section 13.1 and the circuit is strapped to release itself after a CLR routing.

With the storage relays reset as described in the preceding section, a ground is extended from BA–11 via RS–1X and CL–5 to diodes CR41 to CR44 to operate relays N0, N1, P0, and P1 just as if the digits one-one had been dialed. The translator will function as if such digits were dialed and route accordingly.

Digits one-one were strapped in FIG. 4 for ease of illustration, other digits or additional digits may be used as required in specific installations.

(14.0) STOP DIAL

When stop-dial is required, the register-sender will receive a polarity reversal on terminals +0 and –0 from the forward switch train. The reverse polarity energizes relay SD, its windings now magnetically aiding, which operates and opens the circuit between the time division read out relays and conductor TG at contacts SD–1. This circuit is restored when the reverse polarity is removed and relay SD restores. During the reverse potential condition, the register-sender cannot read instructions from the translator and therefore cannot advance the outgoing sequence (i.e. advance SQO).

(15.0) NO CODE

If a time out should occur either before dialing or during dialing, the TM relay will operate as described before. Contacts TM–2 close ground to winding 2 relay RS causing relay RS to operate and reset the storage relays by closing contacts RS–2.

Ground is extended to operate relay NC via BA–11, TM–1, level B of switch SQI, CL–2 and RS–4. When relay NC operates, a holding ground is supplied therefor via BA–11, CL–7 and NC–3 until relay BA restores.

Contacts NC–2 (FIG. 5) close to mark the translator via CCTI during the associated time slot. The translator will then control the register-sender.

Optionally, a no code can release the register-sender by connecting in strap ST–2. Ground is therefore extended via BA–11 and NC–1 to winding 2 of relay RL to initiate the release sequence.

(16.0) MONITOR CIRCUIT

The monitor circuit MON (FIG. 7) continuously tests the operation of the translator. It is arranged to simulate the operation of a register-sender, inserting information into the translator and testing to see that the output of the translator is correct for that input.

Failure of the time division generator and improper translations are detected by the monitor and transfer to duplicate equipment in the time division power supply via connection CTXF or standby equipment in the translator by relay XF is controlled accordingly.

Since the monitor circuit simulates a register-sender, it too is assigned one of the time slots, connections TBN and TGN, and accesses the translator during that time slot.

(17.0) TIME DIVISION MONITOR BY REGISTER-SENDER

If a "permanent" switched ground potential on connection TG or a "permanent" switched battery potential on connection TB should occur, the register-sender will place itself in an alarm condition and indicate the nature of the fault.

Referring to FIG. 11, a steady ground potential on lead TG will operate relay TD on its winding 1 and also via diode CR33 cause lamp L1 to light to indicate a steady ground.

Referring to FIG. 5, a steady battery potential on lead TB will light lamp L2 via diode CR10 to indicate a steady time division battery and operate relay TD on its winding 2.

If either or both of the foregoing conditions occur, contacts TD–1 (FIG. 5) and TD–3 (FIG. 11) open the connections TB and TG, to stop the inputs to the translator and stop reading instructions from the translator, respectively. In FIG. 10 contacts TD–2 open and contacts TD–4 close to replace a steady ground with an impulsing ground on lamp L3 which flashes. Also, in FIG. 10 contacts TD–5 ground relay AL which operates and energizes other visual and audible alarms by way of its contacts AL–1 and AL–2.

(18.0) CLASS OF SERVICE DETECTION

Figure 16:
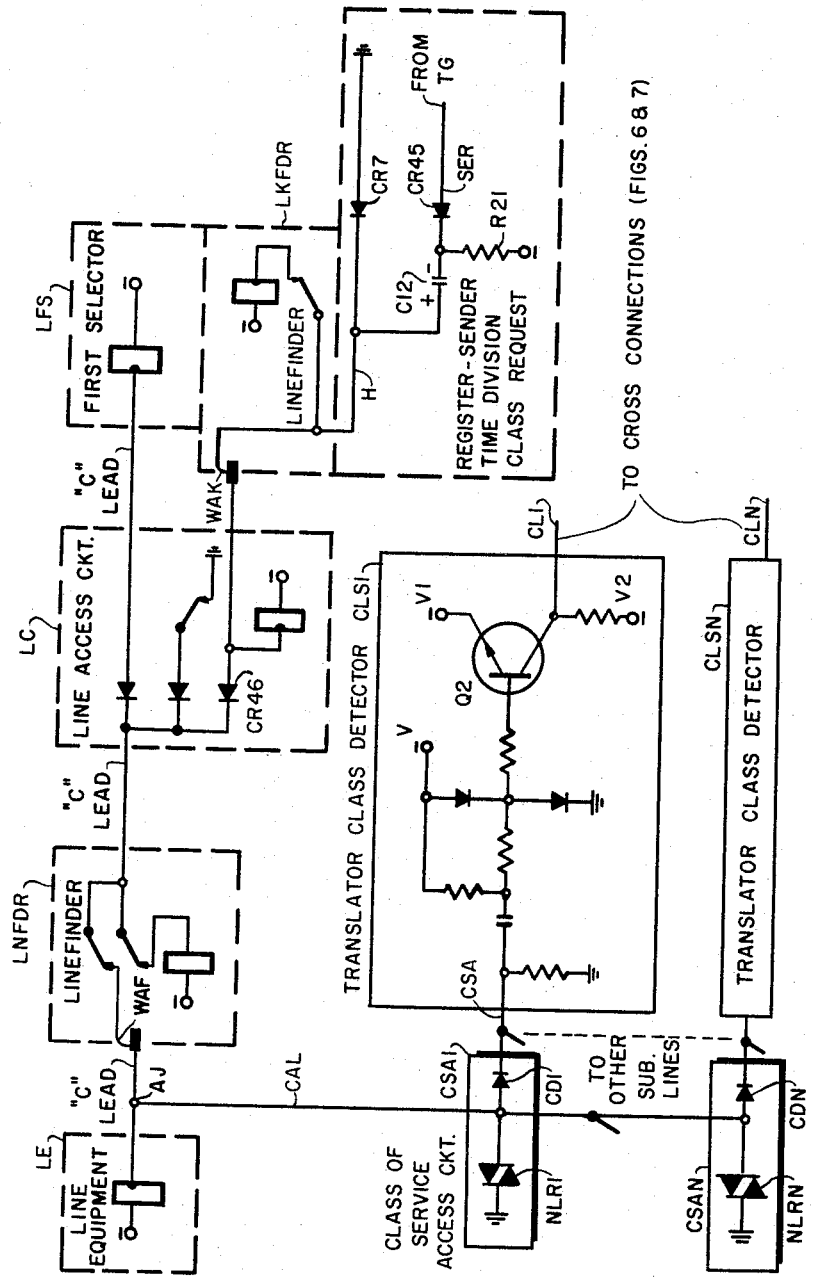
FIG. 16 is a diagram of portions of a step-by-step switching train that are included in the class of service detection circuit.

Referring to FIG. 2, it was noted that upon seizure of the register-sender capacitor C12 was charged to the main battery potential, say 50 volts, by way of diode CR7 and resistance R21. During the assigned time slot the junction between capacitor C12, resistance R21 and diode CR45 is grounded by the switched ground potential from the time division power supply. This grounding circuit may be traced from the time division power supply TDPS (FIG. 7), connection TG (FIGS. 13 and 11), connection SER (FIGS. 11, 5, 4, 3, and 2) to diode CR45. Referring to FIG. 16, the class of service detection circuit including the above mentioned components is shown in greater detail. Capacitor C12 is charged to 50 volts as shown by the polarity marking in FIG. 16. During each time slot the time division power supply transmits a switched ground potential via connection SER and diode CR45 to ground the negative charge side of capacitor C12 at which time the positive charge side of capacitor C12 must instantaneously rise 50 volts in phase with the switched ground potential. This action generates a 50 volt spike which is transmitted to the subscribed line equipment LE by way of connection H, wiper arm WAK of the linkfinder LKFDR, diode CR46 of the link access circuit LC, over the "C" lead between the link circuit and the linefinder LNFDR, linefinder wiper arm WAF, and the "C" lead between the linefinder and the line equipment. Connected to the "C" lead between the subscriber's line equipment and the linefinder at junction AJ by way of connection CAL is a plurality of class of service access circuits. One of these access circuits CSA1 includes a diode CD1 and a nonlinear resistance NLR1. The 50 volt spike will pass through diode CD1 to the translator class detector CLS1 by way of connection CSA. The voltage spike is attenuated and coupled to the base of the transistor Q2 of the inverter portion of the class of service detector. Transistor Q2 is enabled and an output mark is produced on lead CL1 which is cross connected in FIGS. 6, 6A and 6B as an enabling mark source in the translator.

Additional access circuits and detector circuits may be employed in this system for theoretically an unlimited number of classes. However, only one has been shown in FIG. 6B of the translator.

Some automatic toll ticketing systems employ a booster battery potential from the ticketer apparatus which is applied to the "C" lead for automatic number identification. However, both the toll ticketing system of that type and the present director system may be employed in the same office since pulses in the micro-second range do not affect the toll ticketing equipment and the relatively long booster potential applied by a ticketer can be recognized by the class of service equipment. Moreover group and line identification may be accomplished for toll ticketing equipment in a similar manner.

The invention has been described herein in one particular embodiment for purpose of illustration. However, many changes and modifications may be made by one skilled in the art without departing from the spirit and scope of the invention and should be included in the appended claims.

What is claimed is:

1. In a telephone system including automatic switching equipment for establishing telephone circuits, a register-sender-translator arrangement connected to said switching equipment for accepting dialed digits therefrom and for extending routing instructions thereto, each said connection including an incoming loop and an outgoing loop, said register-sender-translator arrangement comprising:
   (a) a translator including a translating matrix having an input and an output;
   (b) a plurality of register-senders each connected to an incoming and an outgoing loop and each having a plurality of inputs and outputs, one of said inputs connected to said translator matrix output and one of said outputs of each said register-sender connected to said translator matrix input and
   (c) a time division signaling arrangement having a plurality of output terminal pairs each connected to a separate one of said register-senders, said signaling arrangement operating to provide to each said pair, during correspondingly assigned cyclic recurring time positions, a first switched potential on one terminal and a second switched potential on the other terminal associate each of said register-senders with said translator during separate time positions.

2. A register-sender-translator arrangement, as claimed in claim 1, wherein each said register-sender comprises:
 (a) dialed digit detection and encoding means including seizure means connected to said incoming loop, said detection and encoding means operated responsive to the receipt of dialed digits by way of said loop, said digits being encoded in a first code pattern;
 (b) a plurality of relays in groups, operated in response to said detecting and encoding means for storing said encoded digits said relays having contacts commonly connected to said one terminal of the corresponding signaling arrangement terminal pair on the one hand and on the other hand separately connected to said translator common input for establishing first pattern time division code marks; and
 (c) incoming sequence means including a first rotary switch having a plurality of banks connected to said storage relays and a plurality of wiper arms each associated with a separate bank and connected to said detecting and encoding means, said first rotary switch controlled by interdigital pauses for storing each digit in a separate storage relay group.

3. A register-sender-translator arrangement, as claimed in claim 2, wherein said seizure means includes relay means for repeating D.C. dial pulses and wherein said detection and encoding means further includes a relay counting chain connected to said pulse repeating relay for counting said pulses.

4. A register-sender-translator arrangement, as claimed in claim 2, said arrangement further comprising multifrequency to direct current conversion apparatus connected to said incoming loop and operated in response to the recipt of multifrequency dialed digits, and wherein said digit detection and encoding means further includes a plurality of relays each connected to said conversion apparatus at least one of which is operated by said apparatus to encode each multifrequency dialed digit.

5. A register-sender-translator arrangement, as claimed in claim 2, wherein said translator matrix comprises:
 converter means connected to said storage relays for changing said first coded digits to decimal form; and
 decimal recognition and encoding means for deriving routing instructions for said register-senders in said first code pattern and in a second code pattern.

6. A register-sender-translator arrangement, such as claimed in claim 5, wherein said converter means comprises a first plurality of logic circuits divided into digit groups, each havng a plurality of inputs and an output, and wherein said digit recognition and encoding means comprises a second plurality of logic circuits and a third plurality of logic circuits each having a plurality of inputs and an output, said logic circuit inputs of said third plurality being connected to a portion of said outputs of said first plurality of logic circuits, and said second plurality of logic circuit inputs being connected to the outputs of said third plurality of logic circuits and to a portion of said outputs of said first plurality of logic circuits.

7. A register sender-translator arrangement, as claimed in claim 6, wherein said digit recognition and encoding means further comprises a plurality of amplifier means each having an input and an output, each said amplifier means having its input connected to at least one of said outputs of said second plurality of logic circuits, and a plurality of diode strapping fields each having an input connected to an output of separate amplifier means and each having at least one output connection forming said output of said translator matrix.

8. In a telephone system including automatic switching equipment for establishing telephone circuits, a register-sender-translator arrangement connected to said switching equipment for accepting dialed digits therefrom and for extending routing instructions thereto, said connections including incoming loops and outgoing loops, said arrangement comprising:
 (a) a translator including a translating matrix having an input and an output;
 (b) a time division signaling arrangement having a plurality of output terminal pairs and operating to provide switched potentials to each of said pair during discrete cyclic recurring time positions, one terminal of each said pair being provided a first switched potential and the other terminal of each said pair being provided a second switched potential; and
 (c) a plurality of register-senders each connected to an incoming and an outgoing loop and each including
 (c1) dialed digit detection and encoding means including seizure means connected to said incoming loop, said detection and encoding means operated responsive to the receipt of dialed digits over said incoming loop to encode said digits in a first code pattern,
 (c2) a plurality of relays divided into groups, said relays operated in response to said detecting and encoding means for storing said encoded digits, said relays having contacts commonly connected to said one terminal of the corresponding signaling arrangement terminal pair on the one hand and on the other hand separately connected to said translator matrix input for establishing first pattern time division code marks,
 (c3) incoming sequence means including a first rotary switch having a plurality of banks connected to said storage relays and a plurality of wiper arms each associated with a separate bank and connected to said detecting and encoding means, said first rotary switch controlled by interdigital pauses for storing each digit in a separate relay group,
 (c4) outgoing sequence means including a second rotary switch having a plurality of banks with contacts and a plurality of wiper arms each associated with a separate one of said banks, a first portion of said bank contacts connected to said translator matrix output for receiving said coded routing instructions, and
 (c5) a plurality of time division read out relays each connected on the one hand to separate wiper arms of said second rotary switch and on the other hand commonly connected to said other terminal of the corresponding signaling arrangement terminal pair, said read out relays selectively operated during the assigned time position by said second potential on said other terminal and the multiple time division marks of said first potential extended from said one terminal through said storage relay contacts, said translator, and said second rotary switch in tandem.

9. A register-sender-translator arrangement, as claimed in claim 8, wherein each said readout relay has a plurality of contacts, and wherein said register-sender further comprises:
 (a) a relay counting chain having contacts connected in a series-parallel arrangement with said readout relay contacts, said contact arrangement connected to a direct current potential;
 (b) sequence relay means in said outgoing sequence means, said sequence relay means controlled by any of said readout relays for controlling said second rotary switch;
 (c) a pulse generator connected to said series-parallel contact arrangement and to some of said sequence relay means contacts, said generator initially operated by said sequence relay means and sustained in operation as said counting chain relays operate via direct current operating paths established by the conjunct operation of at least one counting chain relay and code selected ones of said time division readout relays.

10. A register-sender-translator arrangement, as claimed in claim 9, wherein said automatic switching equipment includes a plurality of outgoing trunk groups and means for providing busy marks for each of said trunk groups when all trunks of a group are in a busy condition, said translator having electrical connections between others of its inputs and each of said outgoing trunk groups to receive said busy marks, and wherein each said register-sender includes as a time division readout relay an alternate route relay, said alternate route relay having contacts serially interposed between said direct current potential and said second rotary switch, the contacts of one of said second rotary switch banks being interposed between said alternate route relay contacts and said second switched potential and having its bank contacts successively connected, omitting predetermined bank contacts, and having its associated wiper arm connected to said alternate route relay contacts, said alternate route relay operated by a time division mark from said translator in response to said busy marks on any of said electrical connections to enable said second rotary switch to step to the next sequential one of said predetermined contacts for alternate routing instructions.

11. A register-sender-translator arrangement, as claimed in claim 8, wherein each said register-sender includes a release relay connected to predetermined ones of said time division readout relay contacts according to said second code pattern and controlled thereby, said release relay having contacts connected to said automatic switching equipment to condition said switching equipment upon operation of said release relay to open said incoming loop and release said register-sender.

12. A register-sender-translator arrangement, as claimed in claim 11, wherein each said register-sender further includes
interdigital timing means including a switch operated in response to excessive interdigital intervals,
a time out relay having a plurality of contacts controlled by said switch, and
a no code relay connected to contacts of said time out relay, said no code relay controlled by said time out relay, said no code relay having contacts connected to said release relay to initiate release of the register-sender.

13. A register-sender-translator arrangement, as claimed in claim 11, wherein each register-sender further includes interdigital timing means including
a switch operated in response to excessive interdigital intervals,
a time out relay having a plurality of contacts controlled by said switch, and
a no code relay having a set of contacts one side of which is connected to said one power supply terminal of the corresponding pair and the other side of which is connected to said translator matrix input, said no code relay controlled by said time out relay for extending time division no code indicative marks to said translator.

14. A register-sender-translator arrangement, as claimed in claim 11, wherein said release relay has other contacts and wherein each said register-sender further comprises a reset relay connected to contacts of said other release relay contacts, said reset relay having contacts connected to said storage relays, said reset relay controlled by said release relay to reset said storage relays.

15. A register-sender-translator arrangement, as claimed in claim 14, wherein each said digit detection and encoding means further includes
a supervisory digit detection relay operated in response to the receipt of a predetermined supervisory digit, said supervisory digit detection having contacts serially connected with contacts of said reset relay,
permanent and interdigital timing means having contacts connected to said reset relay and operated in response to excessive time intervals between digits to operate said reset relay, and
means connecting said serially connected contacts to predetermined ones of said storage relays for storing predetermined digits upon receipt of said supervisory digit.

16. In a telephone system including automatic switching equipment for establishing telephone circuits, a register-sender-translator arrangement connected to said switching equipment for accepting dialed digits therefrom and for extending routing instructions thereto, said connections including incoming loops and outgoing loops, said arrangement comprising:
(a) a translator including a translating matrix having an input and an output;
(b) a time division signaling arrangement having a plurality of output terminal pairs and operating to provide switched potentials to each said pair during discrete cyclic recurring time positions, one terminal of each said pair being provided a first switched potential and the other terminal of each said pair being provided a second switched potential; and
(c) a plurality of register-senders each connected to an incoming and an outgoing loop and each including
(c1) dialed digit detection and encoding means including seizure means connected to said incoming loop for encoding said digits in a first code pattern,
(c2) a plurality of relays in groups, said relays operated in response to said detecting and encoding means for storing said encoded digits, said relays having contacts commonly connected to said one terminal of the corresponding signaling arrangement terminal pair on the one hand and on the other hand separately connected to said translator matrix input for establishing first pattern time division code marks,
(c3) incoming sequence means including a first rotary switch having a plurality of banks connected to said storage relays and a plurality of wiper arms each associated with a separate bank and connected to said detecting and encoding means, said first rotary switch controlled by interdigital pauses storing each digit in a separate relay group,
(c4) a plurality of time division readout relays commonly connected on the one hand to said other terminal of the corresponding signaling arrangement terminal pair and individually connected on the other hand to said translator matrix output, said readout relays operated during the assigned time slot by said second potential on said other terminal and the multiple time division code marks extended from said one terminal through said storage relay contacts and said translator, each of said readout relays having a plurality of contacts,
(c5) outgoing sequence means including a sequence relay and a second rotary switch, said sequence relay connected in multiple to contacts of each of said readout relays and controlled by any of said readout relays controlling the operation of said second rotary switch, said second rotary switch interposed between said translator and said readout relays and having a plurality of banks with contacts and a plurality of wiper arms each associated with a separate one of said banks, a first portion of said bank contacts connected to said translator matrix output for receiving said coded routing instructions, a second portion of said bank contacts also connected to said storage relay contacts for receiving all digits as they are registered, and said wiper arms individually connected to separate ones of said readout relays, (c6) a relay counting chain having contacts connected in a series-parallel arrangement with some of said contacts of said readout relays, said contact arrangement connected to a direct current potential, and (c7) a pluse generator connected to said series-parallel contact arrangement and to some of said sequence relay contacts, said generator initially operated by said sequence relay and sustained in operation as said counting chain relays operate via direct current operating paths established by the conjunct operation of at least one counting chain relay and code selected ones of said time division readout relays, said pulse generator having contacts in said outgoing loop, said contacts being alternately opened and closed during the operation of said generator to outpulse digits.

17. A register-sender-translator arrangement, as claimed in claim 16, wherein said pulse generator comprises a blocking oscillator including a transistor having a base, an emitter and a collector, and a relay connected to said emitter and to said base, said relay connected by way of said series-parallel contact arrangement to a direct current potential.

18. A register-sender-translator arrangement, as claimed in claim 16, wherein each said register-sender further comprises a time control relay connected to said pulse generator, said time control having contacts interposed in said series-parallel contact arrangement for setting said counting chain to a predetermined counting interval and having contacts connected in shunt relation to said pulse generator outpulsing contacts, said time control relay operated in response to a removal of said direct current potential from said pulse generator, said shunt connected contacts overriding said outpulsing contacts for said predetermined counting interval.

19. A register-sender-translator arrangement, as claimed in claim 18, wherein each said register-sender further comprises a digit absorb relay connected to predetermined contacts of said readout relays, said digit absorb relay having normally closed contacts serially interposed in said outgoing loop and normally closed contacts in said series-parallel contact arrangement, said digit absorb relay controlled by said predetermined contacts to open said outgoing loop for a time interval set by said time control relay.

20. A register-sender-translator arrangement, as claimed in claim 18, further comprising multifrequency sending apparatus having an output connected to said outgoing loop and a start connection, said start connection serially connected to contacts of predetermined ones of said time division readout relays and conditioned to enable said multifrequency sending apparatus by the conjunct operation of said predetermined readout relays.

21. A register-sender-translator arrangement, as claimed in claim 20, wherein contacts of said time division readout relays are connected to said multifrequency sending apparatus for selecting frequency combinations according to said first code pattern.

22. A register-sender-translator arrangement, as claimed in claim 18, wherein each said register-sender further comprises an advance sequence relay serially connected to predetermined contacts of said readout relays according to said second code pattern, said advance sequence relay having contacts connected between said direct current potential and one of said second rotary switch banks and there connected to successive ones of a portion of its bank contacts, said advance sequence relay controlled by said predetermined ones of said readout relays to step said second rotary switch past said successively connected contacts.

23. A register-sender-translator arrangement, as claimed in claim 22, wherein each said register-sender further comprises digit delete relay means connected to contacts of said advance sequence relay, said delete relay operation controlled by said advance sequence relay, said delete relay having contacts connected in shunt relation to said outpulsing contacts to prevent outpulsing and having contacts connected between said direct current potential and said second rotary switch, and wherein said pulse generator has second contacts interposed between said second rotary switch and said potential connected contacts, said second rotary switch being advanced to delete digits according to the count set in said series-parallel contact arrangement by said readout relays.

24. A register-sender-translator arrangement, as claimed in claim 18, wherein each said register-sender further comprises relay means for repeating a D.C. pulse dialed digit to said switching equipment including a D.C. dial pulse repeating relay in said seizure means of said digit detection and encoding means connected to said incoming loop and a repeat digit control relay connected to and controlled by said means, said two relays each having contacts in shunt relation to each other and serially interposed in said outgoing loop, said repeat digit control relay being operated to place said D.C. pulse repeating relay contacts alone in series with outgoing loop.

25. A register-sender-translator arrangement, as claimed in claim 24, wherein said digit repeat control relay is also connected to predetermined contacts of said time division readout relay contacts and is also controlled thereby to connect said D.C. pulse repeating relay contacts alone in series with said outpulsing loop.

26. In a telephone system, a time division class of service detection arrangement comprising:
(a) a subscriber line circuit;
(b) a line circuit holding conductor, said holding conductor connected at its one end to said subscriber line circuit and having a holding potential applied thereon during a calling condition;
(c) class of service detection means connected to said line circuit end of said holding conductor; and
(d) means connected to the other end of said holding conductor for generating a voltage pulse of substantially greater magnitude than said holding potential and transmitting said pulse over said holding conductor for enabling said detection means during the time slot associated with said line circuit.

27. A class of service detection arrangement, as claimed in claim 26, wherein said generating means comprises a normally charged capacitance and means for applying to said capacitance a switched potential of a polarity opposite to the normally charged polarity effecting a substantially instantaneous potential rise across said capacitance.

28. A class of service detection arrangement, as claimed in claim 27, wherein said class of service detection means comprises:
(a) access means including diode means connected to said holding conductor and poled in a low impedance direction with respect to said pulse; and
(b) amplifying means connected to said access means for providing time division class of service marks.

29. In a telephone system, a plurality of line circuits, said line circuits being divided into a number of groups, and means for determining the group identity of a calling one of said line circuits, said means comprising:
(a) a plurality of identification requesting circuits,
(b) a common identification receiving circuit;
(c) a control conductor extending between each calling line circuit and one of said identification requesting circuits;
(d) an identification matrix connected on its input side to the control conductor of each said line circuit and on its output side to said common identification receiving circuit; and
(e) a time-division-multiplex signaling arrangement for permitting said plurality of identification requesting circuits to determine the group identity of said calling line circuits, said arrangement comprising means in each said requesting circuit for repetitively, transmitting pulses over said control conductor to said matrix in time positions individual to said requesting circuits, and means in said common receiving circuit responsive to said pulses for providing an indication of the group identity of the line circuits respectively connected to said requesting circuits.

30. In a telephone system including a plurality of scriber line circuits in a calling condition, telephone switching equipment for extending telephone calls, said equipment having a plurality of holding conductors extending therethrough each connected at its one end to a separate one of said line circuits, a plurality of register-senders each associated with a separate one of said line circuits, a translator common to and time-shared by said register-senders, and a time division signaling arrangement connected to each said register-sender and providing at least one switched potential therefor during separate cyclicly recurring time positions, a class of service identification arrangement comprising:
 (a) a normally charged capacitance in each said register-sender, having said switched potential connected to one of its sides, said switched potential being of opposite polarity to the normally charged polarity;
 (b) a class of service request path for each of said line circuits, each said request path including the corresponding holding conductor, each said request path connecting the other side of the corresponding capacitance to the corresponding line circuit;
 (c) at least one class of service access circuit for each line circuit connected to said one end of the corresponding holding conductor; and
 (d) class of service detection means connected to said access circuits for providing time division class of service for each said line circuit to said translator during the time position corresponding to the associated register-sender.

31. A class of service identification arrangement, as claimed in claim 30, and further comprising a seizure circuit in each said register-sender including switch means interposed between the corresponding capacitance and request path for permitting class of service identification upon seizure of the associated register-sender.

32. In a communication system including automatic switching equipment for establishing connections for the transmission of intelligence, a register-sender-translator arrangement comprising:
 a plurality of register-senders each having means for accepting dialed digits from said equipment and for extending routing instructions thereto,
 a translator connected in common to said plurality of register-senders on a time division multiplex basis and including a translating matrix having an input and an output,
 a first marking multiple connecting said registers with said matrix input,
 a second marking multiple connecting said matrix output with said senders,
 marking means connected to said first marking multiple in each said register for selectively and repetitively impressing marking pulses on said first multiple in a predetermined time position corresponding to said register,
 detecting means connected to said second marking multiple in each said sender for detecting said marking potentials as transmitted by way of said first marking multiple, said translator matrix and said second multiple in series from the associated register,
 and means for repetitively enabling the detecting means of said sender in the time slot of the associated register.

33. In a telephone system including automatic switching equipment for establishing telephone circuits, a register-sender-translator arrangement connected to said switching equipment, said connections including an incoming dialing circuit and an outgoing dialing circuit, said arrangement comprising:
 (a) a plurality of registers each connected to an incoming dialing circuit and having means for accepting dialed digits from said switching equipment by way of said incoming dialing circuit;
 (b) a plurality of senders each connected to an outgoing dialing circuit and each individually associated with one of said registers, each said sender having means for extending routing instructions to said switching equipment by way of said outgoing dialing circuit;
 (c) a translating matrix having an input and an output and being provided in common to and time-shared by said pluralities of registers and senders;
 (d) a first plurality of conductors connecting said plurality of registers to send translating matrix input; and
 (e) a second plurality of conductors connecting said plurality of senders to said matrix output, said first plurality of conductors, said matrix and said second plurality of conductors in series forming a common time-division-multiplex signaling channel between said plurality of registers and said plurality of senders.

References Cited

UNITED STATES PATENTS 2,694,753  11/1954  Den Hertog _____ 179—18
2,724,018  11/1955  Pouliart et al. _____ 179—18

KATHLEEN H. CLAFFY, *Primary Examiner.*

WILLIAM C. COOPER, *Examiner.*